United States Patent
Hallmark et al.

[11] Patent Number: 5,857,180
[45] Date of Patent: Jan. 5, 1999

[54] METHOD AND APPARATUS FOR IMPLEMENTING PARALLEL OPERATIONS IN A DATABASE MANAGEMENT SYSTEM

[75] Inventors: Gary Hallmark, San Jose; Daniel Leary, Half Moon Bay, both of Calif.

[73] Assignee: Oracle Corporation, Redwood Shores, Calif.

[21] Appl. No.: 898,080

[22] Filed: Jul. 21, 1997

Related U.S. Application Data

[63] Continuation of Ser. No. 441,527, May 15, 1995, abandoned, which is a continuation of Ser. No. 127,585, Sep. 27, 1993, abandoned.

[51] Int. Cl.$^6$ .................................................. G06F 17/30
[52] U.S. Cl. ............................ 707/2; 707/3; 707/4; 707/5
[58] Field of Search .................................... 395/602, 603, 395/604, 605; 707/2, 3, 4, 5

[56] References Cited

U.S. PATENT DOCUMENTS

| | | | |
|---|---|---|---|
| 4,769,772 | 9/1988 | Dwyer | 364/300 |
| 4,829,427 | 5/1989 | Green | 364/300 |
| 5,091,852 | 2/1992 | Tsuchida et al. | 395/600 |
| 5,325,525 | 6/1994 | Shan et al. | 395/650 |
| 5,339,429 | 8/1994 | Tamaka et al. | 395/700 |
| 5,452,468 | 9/1995 | Peterson | 395/800 |
| 5,495,419 | 2/1996 | Rostoker et al. | 364/468 |
| 5,495,606 | 2/1996 | Borden et al. | 395/604 |
| 5,551,027 | 8/1996 | Choy et al. | 395/602 |
| 5,574,900 | 11/1996 | Huang et al. | 395/601 |
| 5,590,319 | 12/1996 | Cohen et al. | 395/604 |

OTHER PUBLICATIONS

Hong et al, Optimization of Parallel Query Execution Plans in XPRS, IEEE, pp. 218–225, 1991.

Bergsten et al, Prototyping DBS3 a Shared–Memory Parallel Database System, IEEE, 226–234, 1991.

Hirano et al, Load Balancing Algorithm for Parallel Processing on Shared Memory Multiprocessor, IEEE, pp. 210–217, 1991.

Hong et al., "Optimization of Parallel Query Execution Plans in XPRS," Proceedings of the First International Conference on Parallel and Distributed Information Systems, IEEE, 1991, pp. 218–225.

(List continued on next page.)

*Primary Examiner*—Thomas G. Black
*Assistant Examiner*—Frantz Coby
*Attorney, Agent, or Firm*—Blakely, Sokoloff, Taylor & Zafman LLP

[57] ABSTRACT

The present invention implements parallel processing in a Database Management System. The present invention provides the ability to locate transaction and recovery information at one location and eliminates the need for read locks and two-phased commits. The present invention provides the ability to dynamically partition row sources for parallel processing. Parallelism is based on the ability to parallelize a row source, the partitioning requirements of consecutive row sources and the entire row source tree, and any specification in the SQL statement. A Query Coordinator assumes control of the processing of a entire query and can execute serial row sources. Additional threads of control, Query Server, execute a parallel operators. Parallel operators are called data flow operators (DFOs). A DFO is represented as structured query language (SQL) statements and can be executed concurrently by multiple processes, or query slaves. A central scheduling mechanism, a data flow scheduler, controls a parallelized portion of an execution plan, and can become invisible for serial execution. Table queues are used to partition and transport rows between sets of processes. Node linkages provide the ability to divide the plan into independent lists that can each be executed by a set of query slaves. The present invention maintains a bit vector that is used by a subsequent producer to determine whether any rows need to be produced to its consumers. The present uses states and a count of the slaves that have reached these states to perform its scheduling tasks.

19 Claims, 36 Drawing Sheets

OTHER PUBLICATIONS

"An Analysis of Three Transaction Processing Architectures" Anupam Bhide, Computer Science Division, UC Berkeley, 1988, pp. 339–350.

"A Benchmark of NonStop SQL Release 2 Demonstrating Near–Linear Speedup and Scaleup on Large Databases", Susan Englert, et al, Technical Report 89.4, May 1989, pp. 1–23.

"A Benchmark of NonStop SQL on the Debit Credit Transaction", The Tandem Performance Group, 1988, pp. 337–341.

"Data Placement In Bubba", George Copeland, et al., MCC, 1988, pp. 99–108.

"The Design of XPRS", Michael Stonebraker, et al., EECS Department UC Berkeley, 1988, pp. 318–330.

"A Performance Analysis of the Gamma Database Machine", DeWitt, et al., Computer Sciences Department, University of Wisconsin, 1988, pp. 350–360.

"Encapsulation of Parallelism In the Volcano Query Processing System", Goetz Graefe, Computer Science, University of Colorado, Mar., 1990, pp. 102–111.

| Field | Description |
|---|---|
| DFO Type | Type of DFO (e.g., table scan, sort/merge join) |
| Pointer to Parent | Pointer to parent node |
| Pointer to Sibling | Pointer to next-node |
| Row Source Operation | Row source equivilent for this node |
| Table Queue Identifier | Identifies table node for this queue |
| Skipped Node Information | |
| Non-QC Node Infomation | |
|    Pointer to First Child | Pointer to first child of parallelized node |
|    Key Column Number | Number of key columns in input table queue |
|    Partitioning Type | Parellelized node's partitioning type (e.g., hash, key range, rowid range, round robin) |
|    Clumped Columns | Number of clumped colums with parent |
| Predicates | |
| Control Blocks | |
|    Table Scan | Contains table scan information (e.g., table name and degree of parallelism) |
|    Indexed Nested Loop Join (names) | Contains information for an indexed nested loop join (e.g., right and left input table) |
|    Sort/Merge join | Contains information for a sort/merge join (e.g., merge or outer join control flags) |
|    Index Creation | Contains information for index creation (e.g., column list, index type, and storage parameters) |

FIG. 6A

Pointer to Next-to-Execute — Pointer to the next DFO to execute
Table Queue Identifier — Output table queue identifier
Rowid Table Number — Number of tables partitioned by rowid
SQL Statement Size — Size of the SQL statement representing DFO
SQL Statement — SQL statement representing DFO
Flags
   Started — Slave sends "Started" message upon receipt
   Ready — Slave sends "Ready" message when input consumed
   Close — Slave expects to be closed upon completion

FIG. 6B

METHOD AND APPARATUS FOR IMPLEMENTING PARALLEL OPERATIONS IN A DATABASE MANAGEMENT SYSTEM

This is a continuation of application Ser. No. 08/441,527, filed May 15, 1995, now abandoned, which is a continuation of application Ser. No. 08/127,585, filed Sep. 27, 1993.

BACKGROUND OF THE INVENTION

1. Field of the Invention

This invention relates to the field of parallel processing in a database environment.

2. Background Art

Sequential query execution uses one processor and one storage device at a time. Parallel query execution uses multiple processes to execute in parallel suboperations of a query. For example, virtually every query execution includes some form of manipulation of rows in a relation, or table of the DBMS. Before any manipulation can be done, the rows must be read, or scanned. In a sequential scan, the table is scanned using one process.

Parallel query systems provide the ability to break up the scan such that more than one process can perform the table scan. Existing parallel query systems are implemented in a shared nothing, or a shared everything environment. In a shared nothing environment, each computer system is comprised of its own resources (e.g., memory, central processing unit, and disk storage). FIG. 1B illustrates a shared nothing hardware architecture. The resources provided by System one are used exclusively by system one. Similarly, system n uses only those resources included in system n.

Thus, a shared nothing environment is comprised of one or more autonomous computer systems that process their own data, and transmit a result to another system Therefore, a DBMS implemented in a shared nothing environment has an automatic partitioning scheme. For example, if a DBMS has partitioned a table across the one or more of the autonomous computer systems, then any scan of the table requires multiple processes to process the scan.

This method of implementing a DBMS in a shared nothing environment provides one technique for introducing parallelism into a DBMS environment. However, using the location of the data as a means for partitioning is limiting. For example, the type and degree of parallelism must be determined when the data is initially loaded into the DBMS. Thus, there is no ability to dynamically adjust the type and degree of parallelism based on changing factors (e.g., data load or system resource availability).

Further, using physical partitioning makes it difficult to mix parallel queries and sequential updates in one transaction without requiring a two phase commit. These types of systems must do two-phase commit because data is located on multiple disks. That is, transaction and recovery information is located on multiple disks. A shared disk logical software architecture avoids a two-phase commit because all processes can access all disks (see FIG. 1D). Therefore, recovery information for updates can be written to one disk, whereas data accesses for read-only accesses can be done using multiple disks in parallel.

Another hardware architecture, shared everything, provides the ability for any resource (e.g., central processing unit, memory, or disk storage) to be available to any other resource. FIG. 1A illustrates a shared everything hardware architecture. FIG. 1A illustrates a shared everything hardware architecture. All of the resources are interconnected, and any one of the central processing units (i.e., CPU 1 or CPU n) can use any memory resource (i.e., Memory 1 to Memory n) or any disk storage (i.e., Disk Storage 1 to Disk Storage n). However a shared everything hardware architecture cannot scale. That is, a shared everything hardware architecture is feasible when the number of processors is kept at a minimal number of twenty to thirty processors. As the number of processors increases (e.g., above thirty), the performance of the shared everything architecture is limited by the shared bus (e.g., bus 102 in FIG. 1A) between processors and memory. This bus has limited bandwidth and the current state of the art of shared everything systems does not provide for a means of increasing the bandwidth of the shared bus as more processors and memory are added. Thus, only a fixed number of processors and memory can be supported in a shared everything architecture.

SUMMARY OF THE INVENTION

The present invention implements parallel processing in a Database Management System. The present invention does not rely on physical partitioning to determine the degree of parallelism. Further, the present invention does not need to use read lock, or require a two-phased commit in transaction processing because transaction and recovery information is located on multiple disks.

The present invention provides the ability to dynamically partition row sources for parallel processing. That is, partitioning identifies the technique for directing row sources to one or more query slaves. The present invention does not rely on static partitioning (i.e., partitioning based on the storage location of the data).

The present invention can be implemented using any architecture (i.e., shared nothing, shared disk, and shared everything). Further, the present invention can be used in a software-implemented shared disk system (see FIG. 1D). A software-implemented shared disk systems is a shared nothing hardware architecture combined with a high bandwidth communications bus (bus 106 in FIG. 1D) and software that allows blocks of data to be efficiently transmitted between systems.

A central scheduling mechanism minimizes the resources needed to execute an SQL operation. Further, a hardware architecture where processors do not directly share disk architecture can be programmed to appear as a logically shared disk architecture to other, higher levels of software via mechanisms of passing disk input/output requests indirectly from processor to processor over high bandwidth shared nothing networks.

At compilation time, a sequential query execution plan is generated. Then, the execution plan is examined, from the bottom up, to determine those portions of the plan that can be parallelized. Parallelism is based on the ability to parallelize a row source. Further, the partitioning requirements of consecutive row sources and the partitioning requirements of the entire row source tree is examined. Further, the present invention provides the ability for the SQL statement to specify the use and degree of parallelism.

A Query Coordinator (QC) process assumes control of the processing of a query. The QC can also execute row sources that are to be executed serially. Additional threads of control are associated with the QC for the duration of the parallel execution of a query. Each of these threads is called a Query Server (QS). Each QS executes a parallel operator and processes a subset of intermediate or output data. The parallel operators that are executed by a QS are called data flow operators (DFOs).

A DFO is represented as an extended structured query language (SQL) statement. A DFO is a representation of one row source or a tree of row sources suitable for parallel execution. A DFO SQL statement can be executed concurrently by multiple processes, or query slaves. DFOs introduce parallelism into SQL operations such as table scan, order by, group by, joins, distinct, aggregate, unions, intersect, and minus. A DFO can be one or more of these operations.

A central scheduling mechanism, a data flow scheduler, is allocated at compile time. When the top (i.e., root) of a row source tree, or a portion of a serial row source tree is encountered that cannot be implemented in parallel, the portion of the tree below this is allocated for parallelism. A data flow scheduler row source is allocated at compilation time and is executed by the QC process. It is placed between the serial row source and the parallelizable row sources below the serial row source. Every data flow scheduler row source and the parallelizable row sources below it comprise a DFO tree. A DFO tree is a proper subtree of the row source tree. A row source tree can contain multiple DFO trees.

If, at execution, the row source tree is implemented using parallelism, the parallelizer row source can implement the parallel processing of the DFOs in the row source tree for which it is the root node. If the row source tree is implemented serially, the parallelizer row source becomes invisible. That is, the rows produced by the row sources in the DFO tree merely pass through the parallelizer to the row sources above them in the row source tree.

The present invention uses table queues to partition and transport rows between sets of processes. A table queue (TQ) encapsulates the data flow and partitioning functions. A TQ partitions its input to its output according to the needs of the parent DFO and/or the needs of the entire row source tree. The table queue row source synchronously dequeues rows from a table queue. A TQ connects the set of producer slaves on its input to the set of consumer slaves on its output.

During the compilation and optimization process, each node in the row source tree is annotated with parallel data flow information. Linkages between nodes in a row source tree provide the ability to divide the nodes into multiple lists. Each list can be executed by the same set of query slaves.

In the present invention only those processes that are not dependent on another's input (i.e., leaf nodes), and those slaves that must be executing to receive data from these processes execute concurrently. This technique of invoking only those slaves that are producing or consuming rows provides the ability to minimize the number of query slaves needed to implement parallelism.

The present invention includes additional row sources to facilitate the implementation of the parallelism. These include table queue, table access by partition, and index creation row sources. An index creation row source assembles sub-indices from underlying row sources. The sub-indices are serially merged into a single index. Row sources for table and index scanning, table queues, and remote tables have no underlying row sources, since they read rows directly from the database, a table queue, or a remote data store.

A table queue row source is a mechanism for partitioning and transporting rows between sets of processes. The partitioning function of a table queue row source is determined by the partitioning type of the parent DFO.

The present invention provides the ability to eliminate needless production of rows (i.e., the sorcerer's apprentice problem). In some cases, an operation is dependent on the input from two or more operations. If the result of any input operation does not produce any rows for a given consumer of that operation, then the subsequent input operation must not produce any rows for that consumer. If a subsequent input operation were to produce rows for a consumer that did not expect rows, the input would behave erroneously, as a "sorcerer's apprentice."

The present invention uses bit vector to monitor whether each consumer process received any rows from any producer slaves. Each consumer is represented by a bit in the bit vectors. When all of the end of fetch (i.e. eof) messages are received from the producers of a consumer slave, the consumer sends a done message to a central scheduling mechanism (i.e., a data flow scheduler). The data flow scheduler determines whether the consumer slave received any rows, and sets the consumer's bit accordingly. The bit in the bit vector is used by subsequent producers to determine whether any rows need to be produced for any of its consumers. The bit vector is reset at the beginning of each level of the tree.

The dataflow scheduler uses states and a count of the slaves that have reached these states to perform its scheduling tasks. As the slaves asynchronously perform the tasks, transmitted to them by the dataflow scheduler, they transmit state messages to the dataflow scheduler indicating the stages they reach in these tasks. The data flow scheduler keeps track of the states of two DFOs at a time (i.e., the current DFO and the parent of the current DFO). A "started" state indicates that a slave is started and able to consume rows. A "ready" state indicates that a slave is processing rows and is about to produce rows. A "partial" state indicates that a slave is finished scanning a range of rowid, or equivalently, scanning a range of a file or files that contains rows, and needs another range of rowids to scan additional rows. "Done" indicates that a slave is finished processing.

BRIEF DESCRIPTION OF THE DRAWINGS

FIG. 6A provides an example of parallelism annotation information.

FIG. 6B provides an example of information sent to query slaves.

DETAILED DESCRIPTION OF THE INVENTION

A method and apparatus for parallel query processing is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

ROW SOURCES

Prior to execution of a query, the query is compiled. The compilation step decomposes a query into its constituent parts. In the present invention, the smallest constituent parts are row sources. A row source is an object-oriented mechanism for manipulating rows of data in a relational database system (RDBMS). A row source is implemented as an iterator. Every row source has class methods associated with it (e.g., open, fetch next and close). Examples of row sources include: count, filter, join, sort, union, and table scan. Other row sources can be used without exceeding the scope of the present invention.

As a result of the compilation process, a plan for the execution of a query is generated. An execution plan is a plan for the execution of an SQL statement. An execution plan is generated by a query optimizer. A query optimizer compiles an SQL statement, identifies possible execution plans, and selects an optimal execution plan. One method of representing an execution plan is a row source tree. At execution, traversal of a row source tree from the bottom up yields a sequence of steps for performing the operation(s) specified by the SQL statement.

A row source tree is composed of row sources. During the compilation process, row sources are allocated, and each row source is linked to zero, one, two, or more underlying row sources. The makeup of a row source tree depends on the query and the decisions made by the query optimizer during the compilation process. Typically, a row source tree is comprised of multiple levels. The lowest level, the leaf nodes, access rows from a database or other data store. The top row source, the root of the tree, produces, by composition, the rows of the query that the tree implements. The intermediate levels perform various transformations on rows produced by underlying row sources.

Figure 2:
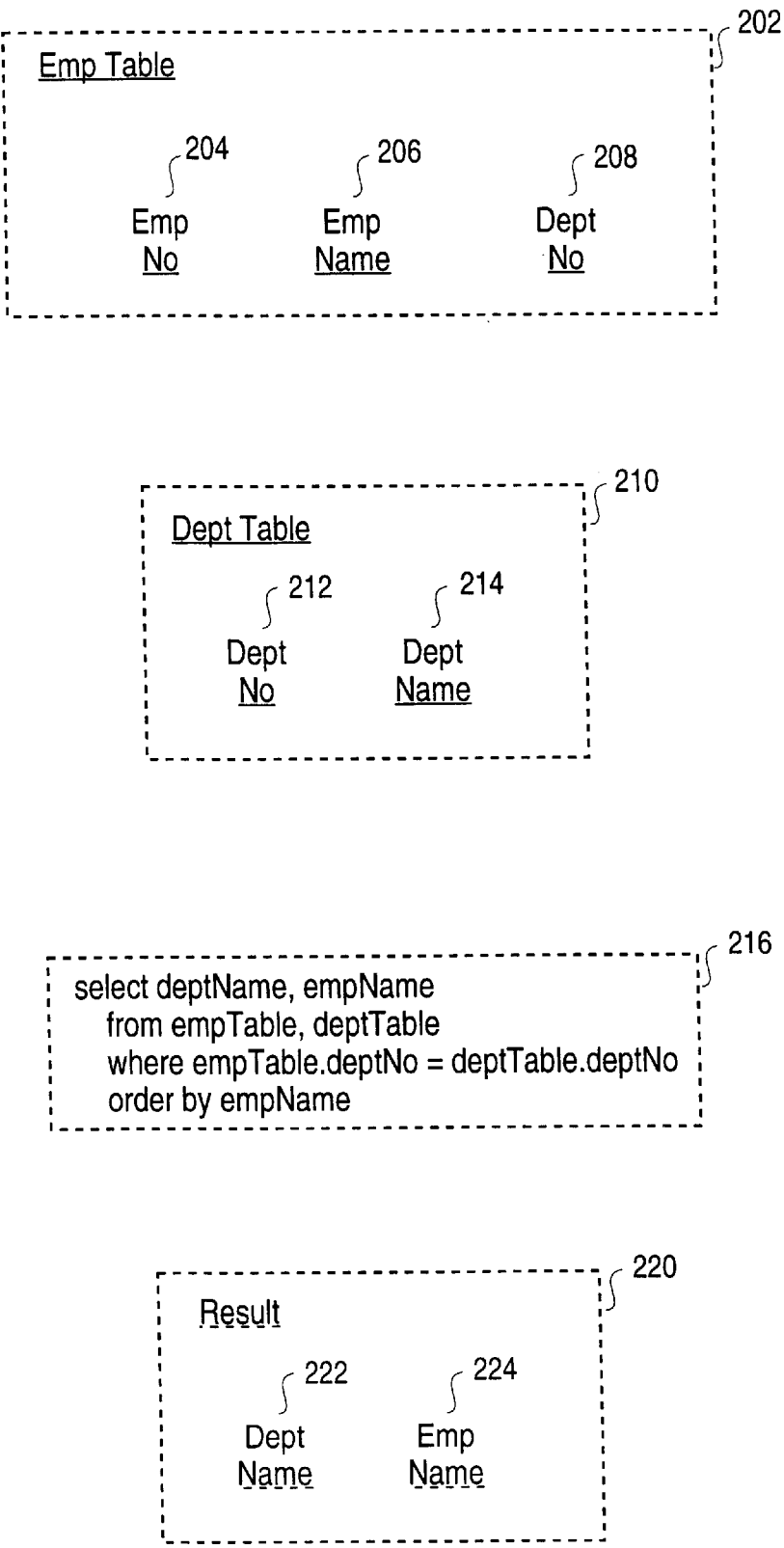
FIG. 2 provides an example of database tables and an Structured Query Language query.

Referring to FIG. 2, SQL statement 216 illustrates a query that involves the selection of department name 214 from department table 210 and employee name 206 from employee table 202 where department's department number is equal to the employee's department number. The result is to be ordered by employee name 206. The result of this operation will yield the employee name and the name of the department in which the employee works in order of employee.

Figure 3A:
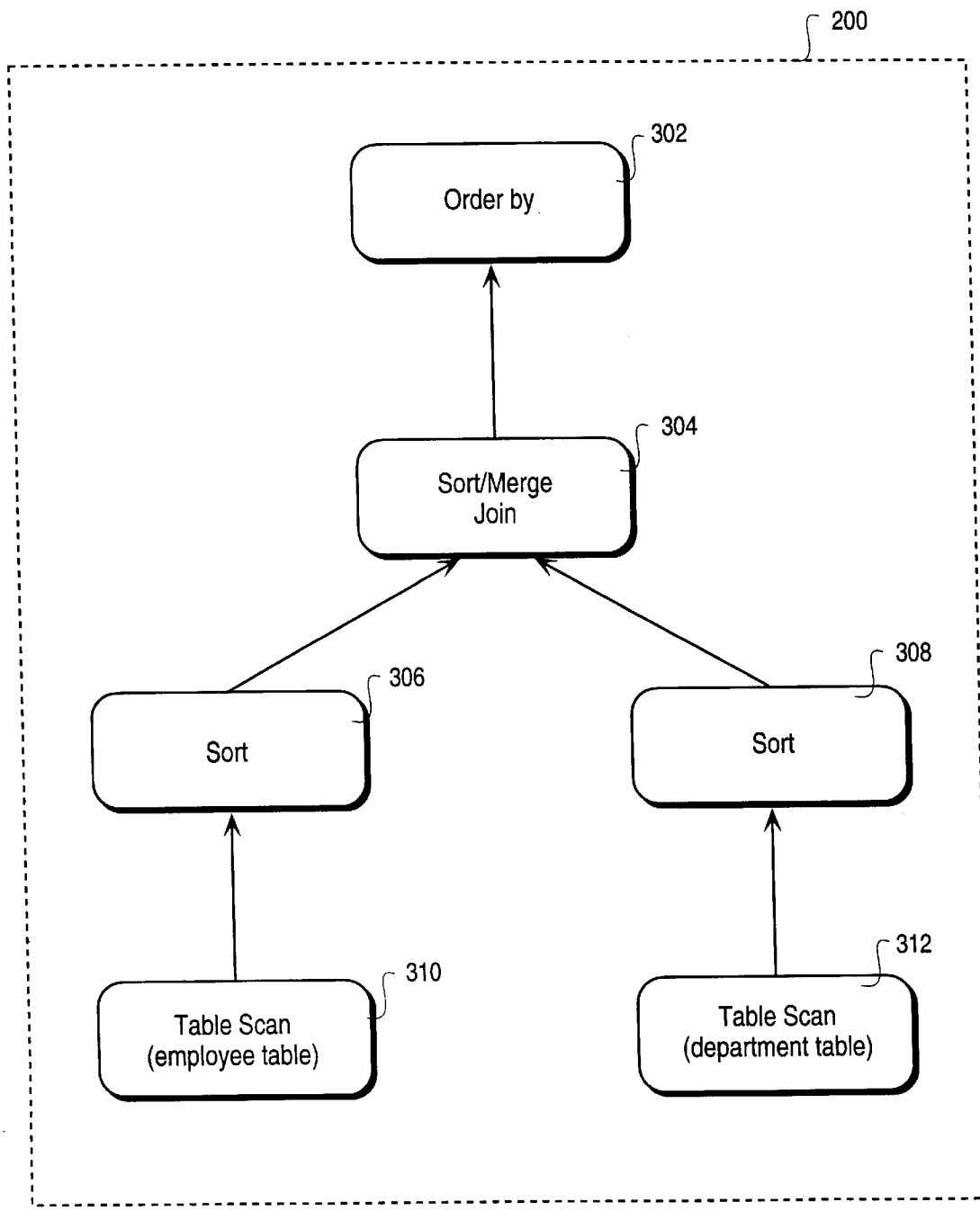
FIG. 3A illustrates an example of a serial row source tree.

An optimal plan for execution of SQL statement 216 is generated. A row source tree can be used to represent an execution plan. FIG. 3A illustrates an example of a row source tree for this query 216. Row source tree 300 is comprised of row sources. Table scan row source 310 performs a table scan on the employee table to generate rows from the employee table. The output of table scan 310 is the input of sort 306. Sort 306 sorts the input by department number. Table scan row source 312 performs a table scan on the department table to generate rows from the department table. The output of table scan 312 is the input of sort 308. Sort 308 sorts the input by department number.

The output from the two sort row sources (i.e., sort 306 and sort 308) is the input to sort/merge join row source 304. Sort/Merge join 304 merges the input from the employee table (i.e., the input from sort 306) with the input from the department table (i.e., the input from sort 308) by matching up the department number fields in the two inputs. The result will become the output of sort/merge join 304 and the input of orderBy 302. OrderBy 302 will order the merged rows by the employee name.

DATA FLOW OPERATORS

A Query Coordinator (QC) assumes control of the processing of a query. The QC can also execute row sources that are to be executed serially. Additional threads of control are associated with the QC for the duration of the parallel execution of a query. Each of these threads is called a Query Server (QS). Each QS executes a parallel operator and processes a subset of the entire set of data, and produces a subset of the output data. The parallel operators that are executed by a QS are called data flow operators (DFOs).

A DFO is a representation of row sources that are to be computed in parallel by query slaves. A DFO for a given query is equivalent to one or more adjacent row sources of that query's row source tree at the QC. Each DFO is a proper subtree of the query's row source tree. A DFO is represented as structured query language (SQL) statements. A DFO SQL statement can be executed concurrently by multiple processes, or query slaves. DFOs introduce parallelism into SQL operations such as table scan, orderBy, group by, joins, distinct, aggregate, unions, intersect, and minus. A DFO can be one or more of these operations. A DFO is converted back into row sources at the query slaves via the normal SQL parsing mechanism. No additional optimization is performed when DFO SQL is processed by the slaves.

An SQL table scan scans a table to produce a set of rows from the relation, or table. A "group by" (groupBy) rearranges a relation into groups such that within any one group all rows have the same value for the grouping column(s). An "order by" (orderBy) orders a set of rows based on the values in the orderBy column(s). A join joins two or more relations based on the values in the join column(s) in the relations. Distinct eliminates any duplicate rows from the rows selected as a result of an operation.

Aggregates compute functions aggregated over one or more groups of rows. Count, sum and average aggregates, for example, compute the cardinality, sum, and average of the values in the specified column(s), respectively. Maximum (i.e. Max) and minimum (i.e., Min) aggregates compute the largest and smallest value (respectively) of the specified column(s) among the group(s) of rows. A union operation creates a relation consisting of all rows that appear in any of two specified relations. An intersect operation creates a relation that consists of all rows that appear in both of two specified relations. A minus operation creates a relation that consists of all rows that appear in the first but not the second of two specified relations.

PARTITIONING

Figure 1A:
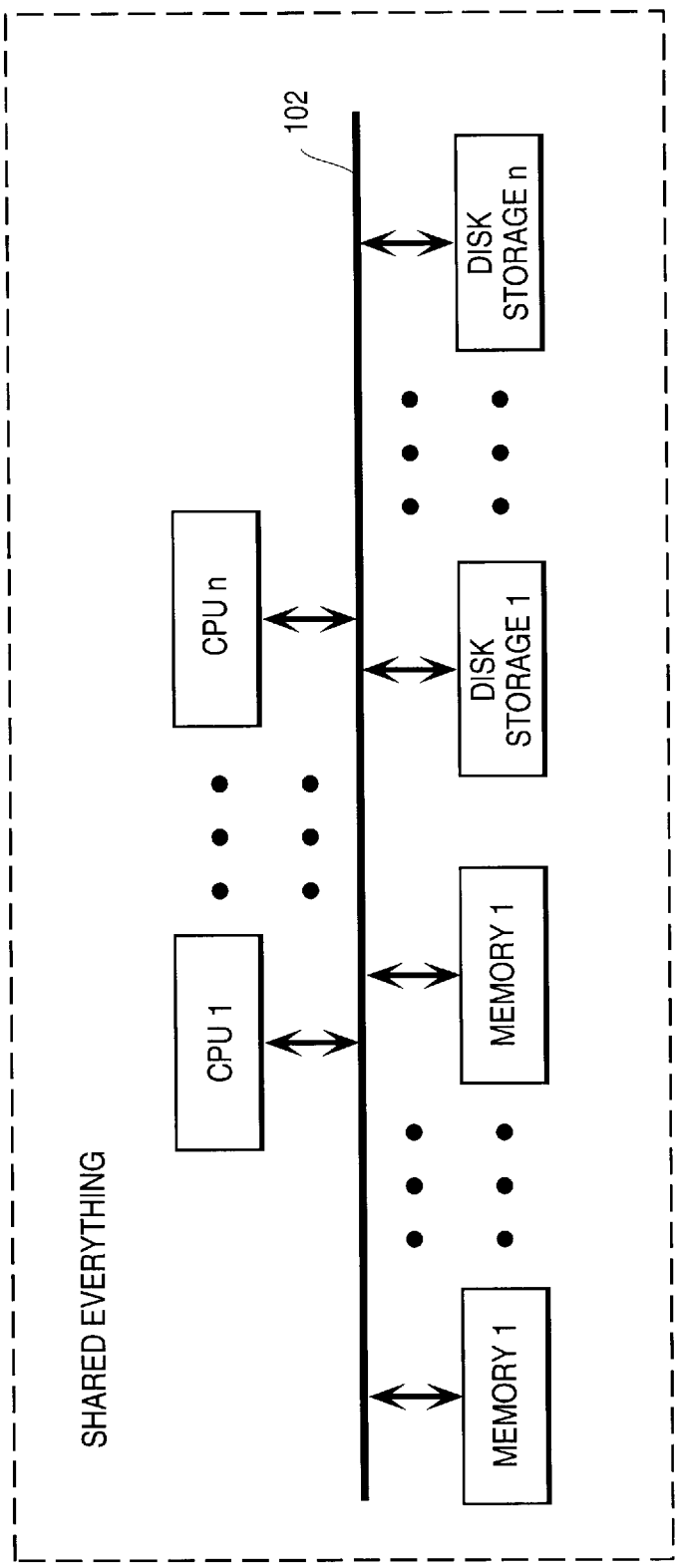
FIGS. 1A–1D illustrates shared everything, shared nothing, and shared disk environments.
Figure 1B:
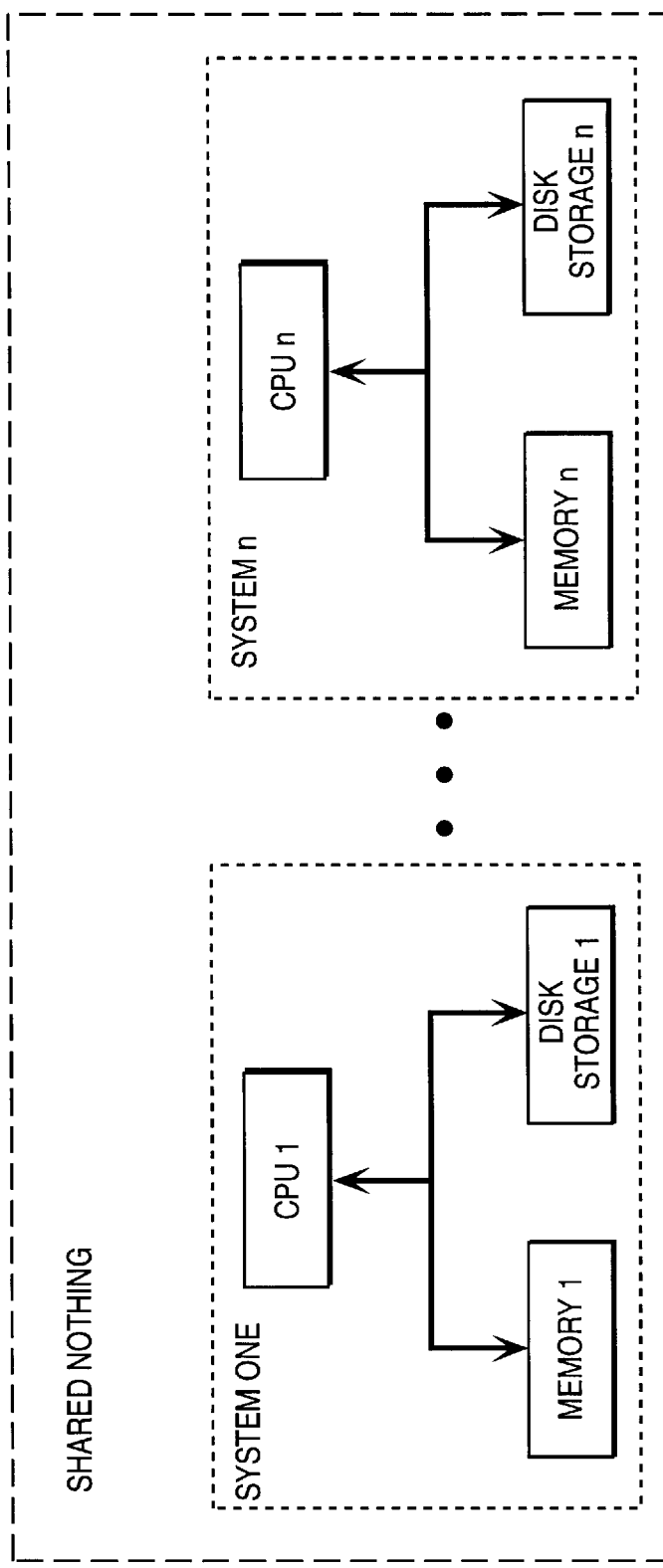

Existing parallel query systems are implemented in a shared nothing environment. FIG. 1B illustrates a shared nothing hardware architecture. In a shared nothing environment, each computer system is comprised of its own resources (e.g., memory, central processing unit, and disk storage). That is, a shared nothing environment is comprised of one or more autonomous computer systems, and each system processes its own data. For example, system one in FIG. 1B is comprised of a central processing unit (i.e., CPU 1), memory (i.e., memory 1), and disk storage (i.e., disk storage 1). Similarly, system n contains similar resources.

A DBMS implemented in a shared nothing environment has an automatic partitioning scheme based on the physical location of data. Therefore, partitioning, in a shared nothing environment, is determined at the time the physical layout of data is determined (i.e., at the creation of a database). Thus, any partitioning in a shared nothing environment is static.

A scan of a table in a shared nothing environment necessarily includes a scanning process at each autonomous system at which the table is located. Therefore, the partitioning of a table scan is determined at the point that the location of data is determined. Thus, a shared nothing environment results in a static partitioning scheme that cannot dynamically balance data access among multiple processes. Further, a shared nothing environment limits the ability to use a variable number of scan slaves. A process, or slave, running in system one of FIG. 1B can manipulate the data that is resident on system one, and then transfer the results to another system. However, the same process cannot operate on data resident on another system (i.e., system two through system n).

Thus, processes on each system can only process the data resident on its on system, and cannot be used to share the processing load at other systems. Therefore, some processes can complete their portion of a scan and become idle while other processes are still processing table scan tasks. Because each system is autonomous, idle processes cannot be used to assist the processes still executing a data access (e.g., table scan) on other systems.

The present invention provides the ability to dynamically partition data. The present invention can be implemented using any of the hardware architectures (i.e., shared nothing, shared disk, or shared everything). Further, the present invention can be used in a software-implemented shared disk system. A software-implemented shared disk system is a shared nothing hardware architecture combined with a high bandwidth communications bus and software that allows blocks of data to be efficiently transmitted between systems. Software implementation of a shared resource hardware architecture reduces the hardware costs connected with a shared resource system, and provides the benefits of a shared resource system.

Figure 1C:
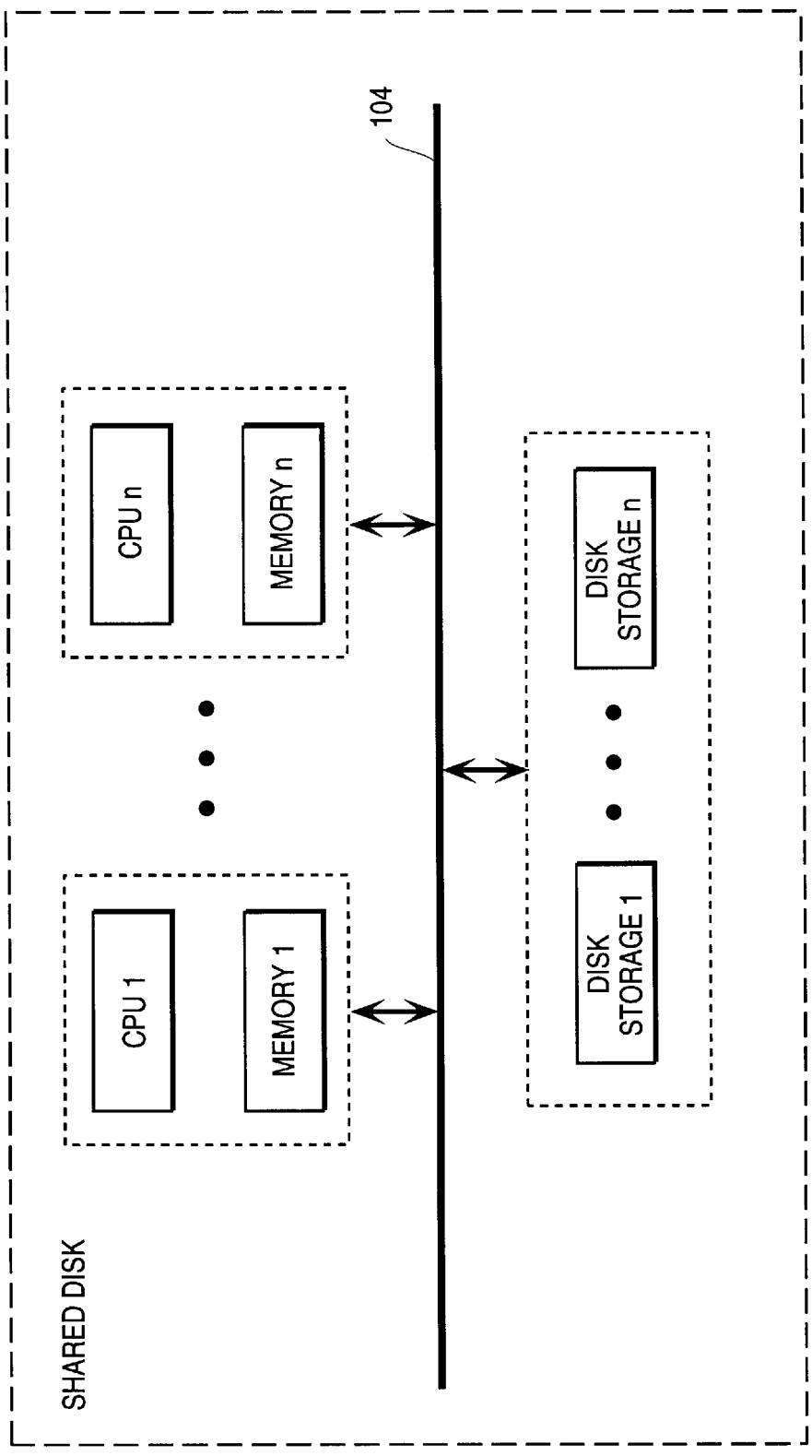
Figure 1D:
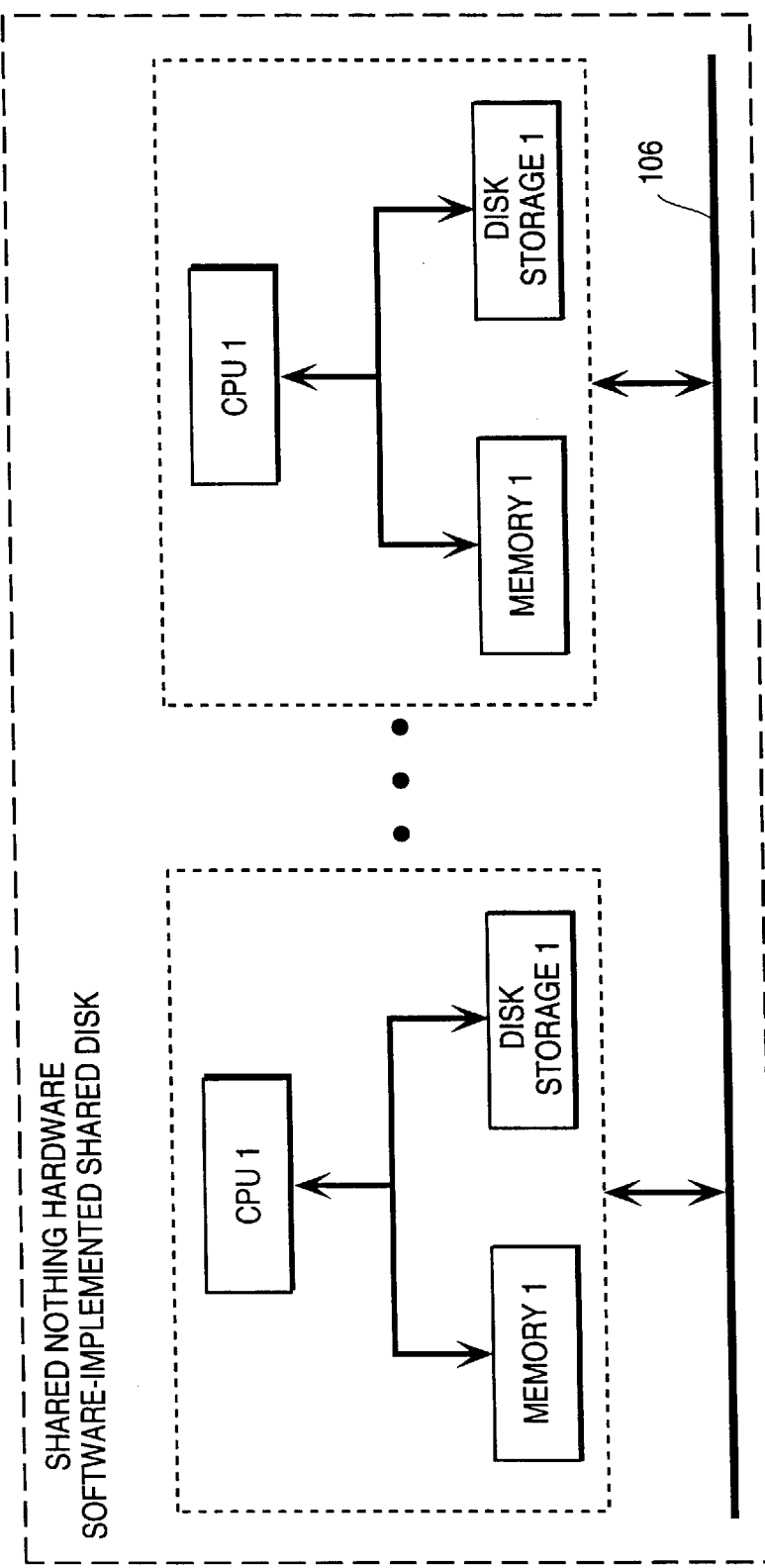

FIG. 1D illustrates a software-implemented shared disk environment, System one through system n remain autonomous in the sense that each system contains its own resources. However, a communications bus connects the systems such that data from system one through system n can transfer blocks of data. Thus, process, or slave, running in system one can perform operations on data transferred from another system (e.g., system n).

In addition to the software-implemented shared disk environment, the present invention can be implemented in a shared everything hardware architecture (illustrated in FIG. 1A), and a shared disk hardware architecture (illustrated in FIG. 1C). In the shared resource environments (FIGS. 1A, 1C, and 1D), any data is accessible by any process (e.g., shared disk and shared everything). Thus, multiple central processing units can access any data stored on any storage device. The present invention provides the ability to dynamically partition an operation (e.g., table scan) based on the amount of data instead of the location of the data.

For example, the present invention provides the ability to spread a table scan across "N" slaves to balance the load, and to perform a table scan on a table such that each slave finishes at virtually the same time. The present invention determines an optimal number of slaves, "N", to perform an operation. All "N" slaves can access all of the data. For example, a table can be divided into three groups of "N" partitions (i.e., "3N") using three groups of "N" ranges(i.e., "3N"). The ranges can be based on the values that identify the rows (i.e., entries) in a table. Further, the "3N" partitions are arranged based on size. Thus, there are "N" large partitions, "N" medium-sized partitions, and "N" small partitions. Each partition represents are partial execution of the scan operation.

The larger groups of rowids are submitted to the "N" slaves first. Each slave begins to process its rowid range. It is possible for some processes to complete their tasks before others (e.g., system resource fluctuations or variations in the estimations of partition sizes). When a process completes a partial execution, another set of rowid ranges can be submitted to the process. Since all of the large partitions were submitted to the "N" slaves at the start of a scan, faster slaves receive a medium or small rowid range partial execution. Similarly, as each slave completes its current rowid range, additional rowid ranges can be submitted to the slave. Because decreasing sizes of rowid ranges are submitted to the faster slaves, all of the slaves tend to finish at virtually the same time.

Partitioning Types

The present invention provides the ability to dynamically partition using any performance optimization techniques. For example, prior to the execution of an operation to sort a table (i.e., order by), a sampling can be performed on the data in the table. From the results of the sampling, even distributions of the rows can be identified. These distributions can be used to load balance a sort between multiple processes.

Some examples of partitioning include range, hash, and round-robin. Range partitioning divides rows from an input row source to an output row source based on a range of values (e.g., logical row addresses or column value). Hash partitioning divides rows based on hash field values. Round-robin partitioning can divide rows from an input row source to an output row source when value based partitioning is not required. Some DFOs require outputs to be replicated, or broadcast, to consumers, instead of partitioned.

PLAN PARALLELIZATION

A serial execution plan (e.g., FIG. 3A) provides a non-parallelized representation of a plan for execution of a query. In serial query processing, only one thread of control processes an entire query. For example, a table scan of the employee table (i.e., table scan 310 in FIG. 3A), for example, is scanned sequentially. One process scans the employee table.

The parallelism of the present invention provides the ability to divide an execution plan among one or more processes, or query slaves. Parallel query execution provides the ability to execute a query in a series of parallel steps, and to access data in parallel. For example, a table scan of the employee table can be partitioned and processed by multiple processes. Therefore, each process can scan a subset of the employee table.

At compilation time, a sequential query execution plan is generated. Then, the execution plan is examined, from the bottom up, to determine those portions of the plan that can be parallelized. Parallelism is based on the ability to parallelize a row source. Further, the partitioning requirements of consecutive row sources and the partitioning requirements of the entire row source tree is examined. Further, the present invention provides the ability for the SQL statement to specify the use and degree of parallelism.

The present invention provides the ability to combine parallelism and serialism in the execution of a query. Parallelism may be limited by the inability to parallelize a row source. Some row sources cannot be parallelized. For example, an operation that computes row numbers must allocate row numbers sequentially. When a portion of a row source tree is encountered that cannot be implemented in parallel, any portion below the serial row source is allocated for parallelism. A parallelizer row source is allocated between the serial row source and the parallelizable row sources below the serial row source. The parallelizer row source and the parallelizable row sources below it comprise a DFO tree. The output of this DFO tree is then supplied as input to the serial row source. A row source tree can contain multiple DFO trees.

If, at execution, a given row source tree is implemented using parallelism, the parallelizer row source can implement the parallel processing of the parallelizable DFOs in the row source tree for which it is the root node. If the row source tree is implemented serially, the parallelizer row source becomes invisible. That is, the rows produced by the row sources in the DFO tree merely pass through the parallelizer row source to the row sources above it in the row source tree.

The row source tree is examined to determine the partitioning requirements between adjacent row sources, and the partitioning requirements of the entire row source tree. For example, the presence of an orderBy row source in a row source tree requires that all value based partitioning in the row source tree below the orderBy must use range partitioning instead of hash partitioning. This allows the orderBy to be identified as a DFO, and its operations parallelized, since ordered partitioning of the orderBy DFO's output will then produce correct ordered results.

An orderBy operation orders the resulting rows (i.e., the output from the executed plan) according to the orderBy criteria contained in the SQL statement represented by the execution plan. To parallelize an orderBy operation, the query slaves that implement the operation each receive rows with a range of key values. Each query can then order the rows within its range. The ranges output by each query slave (i.e., the rows ordered within each range) can then be concatenated based on the orderBy criteria. Each query slave implementing the orderBy operation expects row sources that fall within the range specification for that query slave. Thus, the operations performed prior to the orderBy operation can be performed using range partitioning to facilitate the direction of the rows according to the range specification.

Figure 3B:
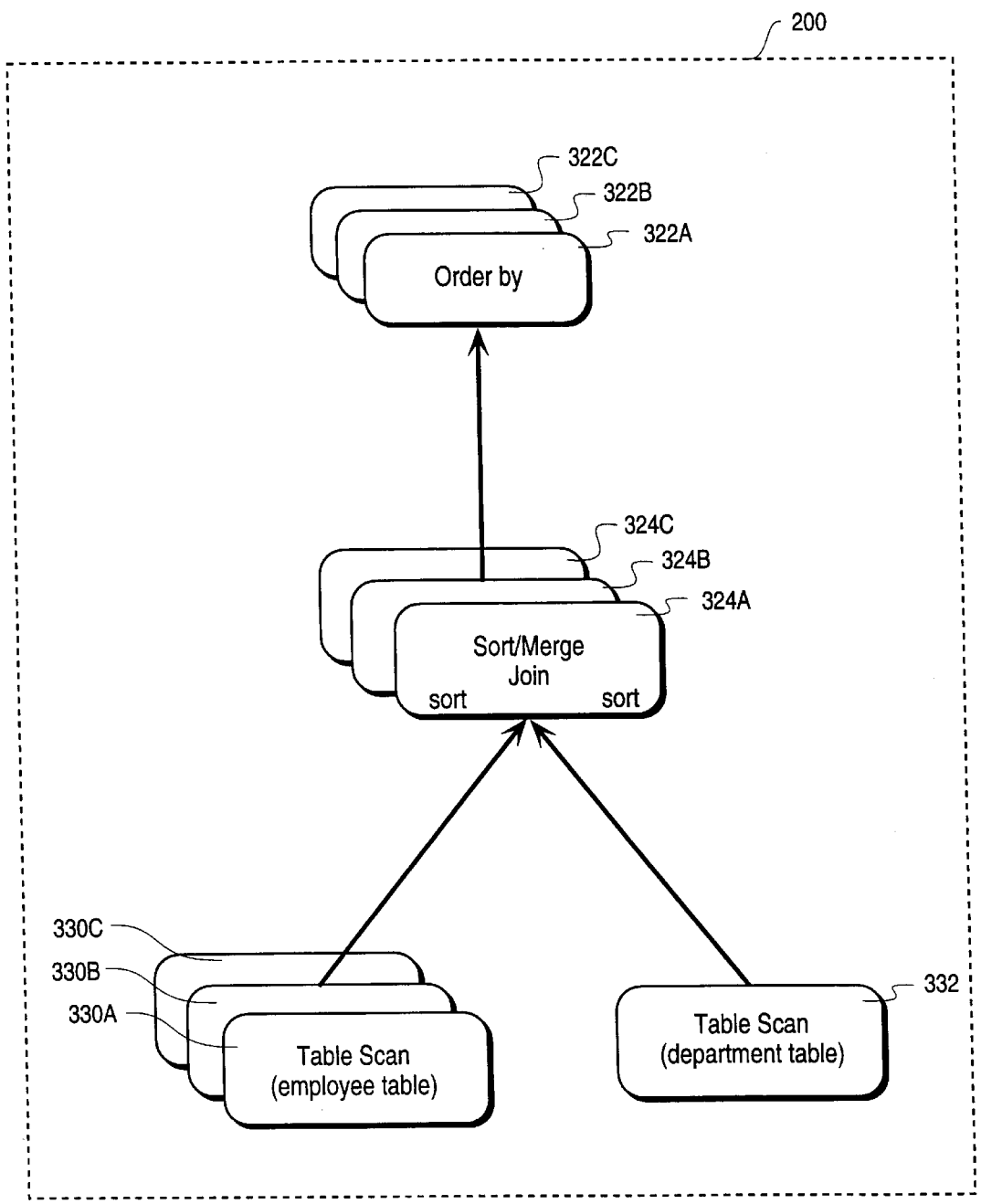
FIG. 3B illustrates a parallelized row source tree.

FIG. 3B illustrates a row source tree in which parallelism has been introduced. Table scan 310 in FIG. 3A is processed by a single process, or query slave. In FIG. 3B, table scan 310 is partitioned into multiple table scans 330A–330C. That is, the table scan of the employee table is processed by multiple process, or query slaves.

FIG. 3B represents a parallel DFO tree corresponding to the row source tree depicted in FIG. 3A. Sort 306 and sort 308 of FIG. 3A are combined with sort/merge join 304 to distinguish the sort/merge join DFO of FIG. 3B. Referring to FIG. 3B, slave DFOs 324A–324C perform the sort and join operations. The output of slave DFOs 330A–330C is transmitted to slave DFOs 324A–324C.

Table scan 332 scans a table (i.e., department table) that does not contain many rows. Thus, the application of parallelism to scan the department table may not improve performance. Therefore, table scan 332 can be implemented as a non-parallel scan of the department table. The output of table scan 332 becomes the input of slave DFOs 324A–324C.

An SQL statement can specify the degree of parallelism to be used for the execution of constituent parts of an SQL statement. Hints incorporated in the syntax of the statement can be used to affect the degree of parallelism. For example, an SQL statement may indicate that no amount of parallelism is to be used for a constituent table scan. Further, an SQL statement may specify the maximum amount of partitioning implemented on a table scan of a given table.

TABLE QUEUES

Some DFOs function correctly with any arbitrary partitioning of input data (e.g., table scan). Other DFOs require a particular partitioning scheme. For example, a group by DFO needs to be partitioned on the grouping column(s). A sort/merge join DFO needs to be partitioned on the join column(s). Range partitioning is typically chosen when an orderBy operation is present in a query. When a given child DFO produces rows in such a way as to be incompatible with the partitioning requirements of its parent DFO (i.e., the DFO consuming the rows produced by a child DFO), a table queue is used to transmit rows from the child to the parent DFO and to repartition those rows to be compatible with the parent DFO.

The present invention uses a table queue to partition and transport rows between sets of processes. A table queue (TQ) encapsulates the data flow and partitioning functions. A TQ partitions its input to its output according to the needs of the consumer DFO and/or the needs of the entire row source tree. The table queue row source synchronously dequeues rows from a table queue. A TQ connects the set of producers on its input to the set of consumer slaves on its output.

A TQ provides data flow directions. A TQ can connect a QC to a QS. For example; a QC may perform a table scan on a small table and transmit the result to a table queue that distributes the resulting rows to one or more QS threads. The table queue, in such a case, has one input thread and some number of output threads equaling the number of QS threads. A table queue may connect some number, N, of query slaves to another set of N query slaves. This table queue has N input threads and N output threads. A table queue can connect a QS to a QC. For example, the root DFO in a DFO tree writes to a table queue that is consumed by the QC. This type of table queue has some number of input threads and one output thread.

Figure 4:
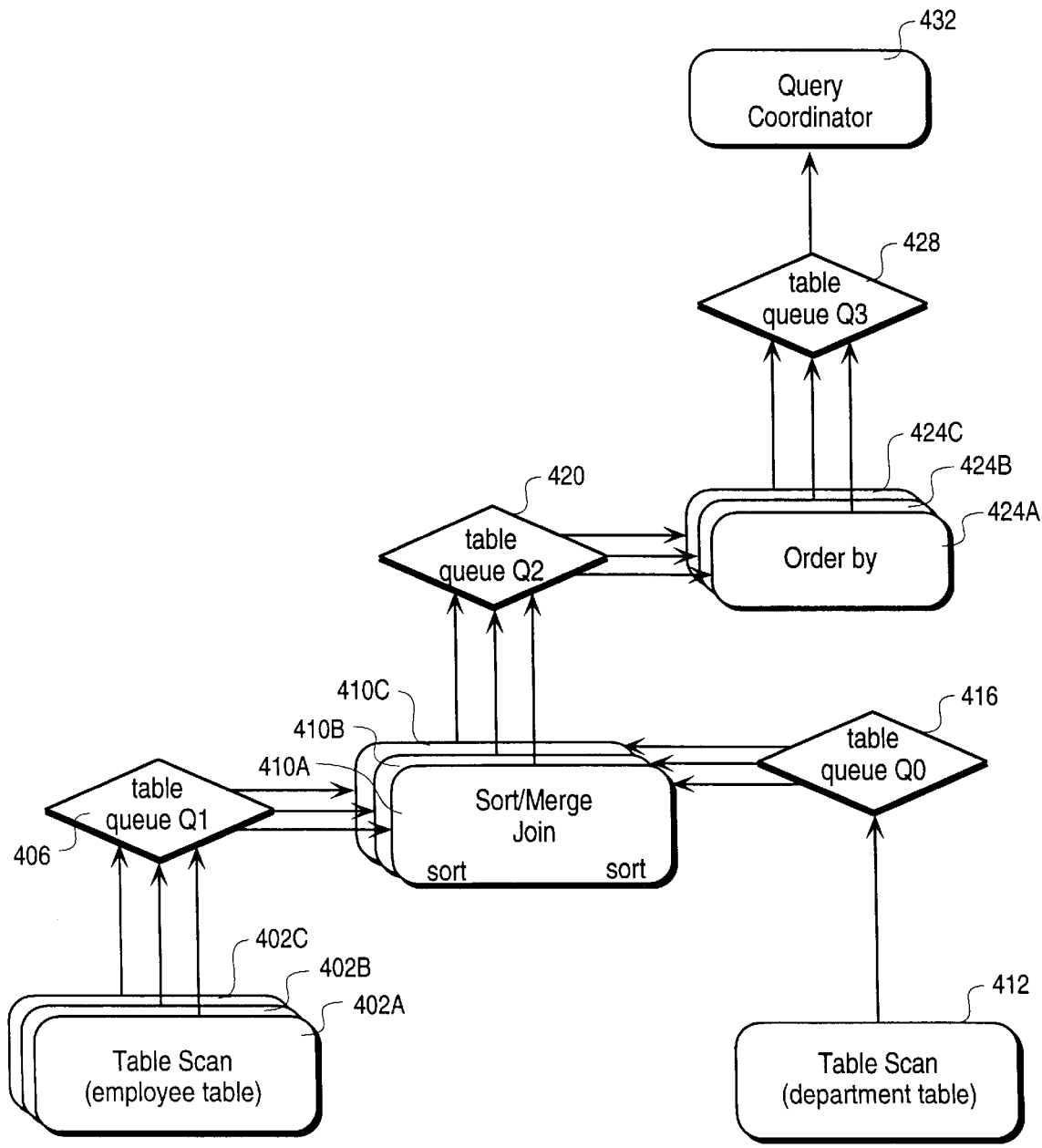
FIG. 4 illustrates table queues.

FIG. 4 illustrates table queues using the parallel execution plan of SQL statement 216 in FIG. 2. Referring to FIG. 3B, the output of the table scans 330A–330C becomes the input of sort/merge join DFOs 324A–324C. A scan of a table can be parallelized by partitioning the table into subsets. One or more subsets can be assigned to processes until the maximum number of processes are utilized, or there are no more subsets.

While an ordering requirement in an SQL statement may suggest an optimal partitioning type, any partitioning type may be used to perform a table scan because of the shared resources (e.g., shared disk) architecture. A table queue can be used to direct the output of a child DFO to its parent DFO according to the partitioning needs of the parent DFO and/or the entire row source tree. For example, table queue 406 receives the output of table scan DFOs 402A–402C. Table queue 406 directs the table scan output to one or more sort/merge join DFOs 410A–410C according to the partitioning needs of DFOs 410A–410C.

In some instances, there is virtually no benefit in using parallel processing (e.g., table scan of a table with few rows). Referring to FIG. 4, table scan 412 of a small table (i.e., department table) is not executed in parallel. In the preferred embodiment, a table scan performed by a single process is performed by QC 432. Thus, the input to table queue 416 is output from QC 432. Table queue 416 directs this output to the input of DFOs 410A–410C. Table queue 416 connects QC 432 to QS slave DFOs 410A–410C. The input from table queues 406 and 416 is used by DFOs 410A–410C to perform a sort/merge join operation.

The output of DFOs 410A–410C is transmitted to table queue 420. Table queue 420 directs the output to DFOs 424A–424C. The existence of an orderBy requirement in an SQL statement requires the use of a type of range partitioning for table queue 420, and is suggested for range partitioning of TQ 406 and 416. Range partitioning will result in row partitions divided based on sort key value ranges. In the present example, SQL statement 216 in FIG. 2 specified an order in which the selected rows should be provided (i.e., ordered by employee name). Therefore, range partitioning is the partitioning scheme to execute SQL statement 216 in parallel. Thus, table queue 420 can direct a set of rows to each of the query slaves executing DFOs 424A–424C based on a set of ranges. Range partitioning can be used to divide the rows, by value ranges, between the query slaves processing the rows.

DFO SQL

A DFO is represented as structured query language (SQL) statements. For example, block 216 in FIG. 2 illustrates a selection operation from employee and department tables. A selection operation includes a scan operation of these tables. The DFO SQL for the employee table scan is:

```
select /*+rowid(e)*/ deptno c1, empname c2
from emptable
where rowid between :1 and :2
```

The ":1" and ":2" are rowid variables that delimit a rowid range. Actual rowid values are substituted at the beginning of execution. As each slave completes the scanning of a rowid range (i.e., completion of a partial execution), additional rowid values are substituted at each subsequent partial execution. The scan produces the department field and employee name values.

The DFO SQL statement above illustrates extensions of SQL that provide the ability to represent DFOs in a precise and compact manner, and to facilitate the transmission of the parallel plan to multiple processes. One extension involves the use of hints in the DFO SQL statement that provide the ability to represent a DFO in a precise and compact way. In additional to the hint previously discussed to specify the use and/or degree of parallelism, the present invention provides the ability to incorporate hints in a DFO SQL statement to specify various aspects of the execution plan for the DFO SQL statement. For example, in the previous DFO SQL statement, the phrase "/*+rowid(e) */" provides a hint as to the operation of the table scan DFO (i.e., use rowid partitioning). Other examples are: "full" (i.e., scan entire table), "use_merge" (i.e., use a sort/merge join), and "use_n1" (i.e., use a nested loop join).

Another extension provides the ability to use and reference table queues. The output of the employee table scan is directed to a table queue (e.g., Q1) as illustrated in FIG. 4. The contents of table queue Q1 become the input to the next operation (i.e., sort/merge). The DFO SQL statement assigns aliases for subsequent references to these fields. The DFO statement further creates a reference for the columns in the resulting table queue (i.e., "c1" and "c2"). These "aliases" can be used in subsequent SQL statements to reference the columns in any table queue.

A second table scan is performed on the department table. As illustrated previously, because the department table is small (i.e., a lesser number of table entries), the department table scan can be performed serially. The output of the department table scan is directed to the Q0 table queue. The contents of Q0 table queue becomes the input to the sort/merge operation.

The DFO SQL for the sort/merge operation is:

```
select /*+use_merge(a2)*/ a1.c2,a2.c2
from :Q1 a1, :Q0 a2
where a1.c1 = a2.c1
```

The sort/merge DFO SQL operates on the results of the employee table scan (i.e., Q1 table queue, or "a1"), and the results of the department table scan (i.e., Q0 table queue, or "a2"). The output of the sort/merge join DFO is directed to table queue Q2 as illustrated in FIG. 4. The contents of table queue Q2 becomes the input to the next operation (i.e., orderBy). The DFO SQL for the orderBy operation is:

select c1, c2 from :Q2 order by c1

The orderBy operation orders the results of the sort/merge join DFO. The output of the orderBy operation is directed to the requester of the data via table queue Q3.

COMBINED DFOs

If the partitioning requirements of adjacent parent-child DFOs are the same, the parent and child DFOs can be combined. Combining DFOs can be done using the SQL mechanism. For example, a reference to a table queue in a SQL statement (e.g., Qn) is replaced with the SQL text that defines the DFO. For example, if block 216 in FIG. 2 specified "order by deptNo," the sort/merge join and the orderBy operations can be combined into one DFO SQL. Thus, the first two statements can be combined to be statement three:

```
1. select /*+ordered use_merge(a2)*/ a1.c2,a2.c2,a2.c2
   from :Q1 a1, :Q0 a2
   where a1.c1 = a2.c1
2. select c2, c3 from :Q2 order by c1
3. select c2, c3
   from (select /*+ordered use_merge(a2)*/ a1.c1 c1,a1.c2 c2,
   a2.c2 c3
   from :Q1 a1, :Q0 a2
   where a1.c1 = a2.c1)
   order by c1
```

PLAN ANNOTATIONS

During the compilation and optimization process, each node in the row source tree is annotated with parallel data flow information. FIG. 6A provides an example of parallelism annotation information. If the node is a DFO, the type of DFO is retained (e.g., table scan, sort/merge join, distinct, and orderBy). If the node is a serial row source to be processed by the QC, the table queue to which the QC outputs the rows generated from the execution of the row source is stored with the other information associated with the row source, A node that represents a DFO also contains information regarding the DFO.

The number of query slaves available at the time of execution effects the degree of parallelism implemented. The number of available processes may be affected by, for example, quotas, user profiles, or the existing system activity. The present invention provides the ability to implement any degree of parallelism based on the number of query slaves available at runtime. If enough query slaves are available, the degree of parallelism identified at compile time can be fully implemented. If some number less than the number needed to fully implement the degree of parallelism identified at compile time, the present invention provides the ability to use the available query slaves to implement some amount of parallelism. If the number of available query slaves dictates that the query be implemented serially, the present invention retains the row source equivalent for each node. Thus, the present invention provides the ability to serially implement a query parallelized at compile time.

If the node is implemented by the QC, the output table queue identifier is included in the node information. If the node is not implemented by the QC, the pointer to the first child of the parallelized node, the number of key columns in the input table queue, the parallelized node's partitioning type, and the number of columns clumped with parent are included in the node information.

If the node represents a table scan DFO, the information includes table scan information such as table name and degree of parallelism identified for the scan. If the DFO is an indexed, nested loop join, the information includes the right and left input table names. If the DFO is a sort/merge join, the information includes two flags indicating whether the operation is a merge join or an outer join. If the DFO represents an index creation, the information includes a list of columns included in the index, the index type, and storage parameters.

At the time of implementation, information describing the DFOs is sent to the query slaves implementing the DFOs. All DFOs of an even depth are sent to one slave set. All DFOs of an odd depth are sent to the other slave set. Depth is measured from the top (root) node of the tree. FIG. 6B provides an example of information sent to query slaves. This information includes a pointer to the next DFO for the slave set to execute. The next-to-execute pointer points to the next DFO at the same depth, or, if the current DFO is the last at its depth, the pointer points to the leftmost DFO in the tree at depth-2. The next-to-execute pointer links the DFOs not implemented by the QC into a set of subtrees, or lists.

Using the next-to-execute pointer, a row source tree can be split into two DFO lists that can be executed by two sets of query slaves. The DFOs executed by a first set of query slaves is given by a list starting with the leftmost leaf of the DFO tree and linked by the next-to-execute pointers. The DFOs executed by a second set of query slaves is given by the list starting with the parent of the leftmost leaf and linked by another set of sibling pointers.

The present invention can be implemented without a central scheduling mechanism. In such a case, all of the slaves needed to implement the DFOs are implemented at the start of execution of the row source tree. However, many of the slaves must wait to begin processing (i.e., remain idle) until other slaves supply data to them.

In the preferred embodiment of the present invention, a central scheduling mechanism is used to monitor the availability of data, and to start slaves as the data becomes ready for processing by the slaves. Therefore, the only slaves that are started are those that can begin processing immediately (i.e., leaf nodes), and those slaves that must be executing to receive data from the leaf nodes. This technique of invoking only those slaves that are producing or consuming rows provides the ability to minimize the number of query slaves needed to implement parallelism.

For example, a first set of query slaves can be used to produce rows for a second set of query slaves. Once the first set (i.e., the producing set of query slaves) completes its task of producing rows, the set can be used to implement the DFOs that consume the output from the second set of query slaves. Once the second set of slaves completes its task of producing rows for the first set, the set can be used to implement the level of the tree that receives input from the first set. This technique of folding the DFO tree around two sets of slave sets minimizes the number of slaves needed to implement a tree. As the depth of the tree increases, the savings in processing power increases. Further, this technique provides the ability to implement an arbitrarily complex DFO tree.

Figure 3C:
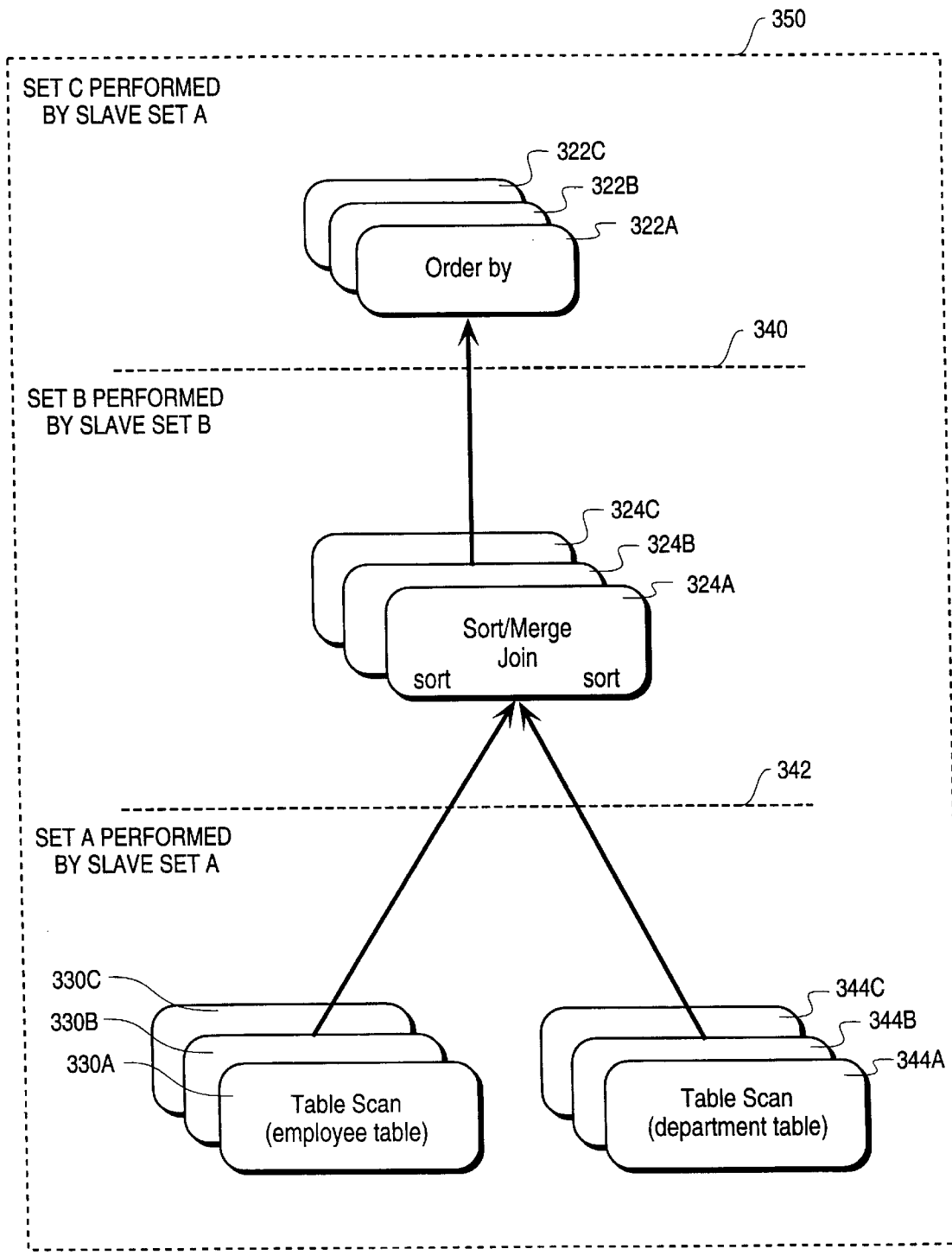
FIG. 3C illustrates a row source tree divided into levels each of which is implemented by a set of query slaves.

FIG. 3C illustrates a row source tree divided into thirds (i.e., Sets A–C) by lines 340 and 342 representing the levels of the tree that can be implemented by one set of query slaves. For example, Set A includes DFOs 330A–C and DFOs 344A–344C. These DFOs can be processed by a first slave set (i.e., slave set A).

The query slaves in slave set A perform table scans on an employee table and a department table. The rows generated by these tables scans are the output of slave set A. The output of slave set A becomes the input of the query slaves in set B. Thus, the query slaves in set B must be ready to receive the output from slave set A. However, the query slaves implementing the operations in set C do not have to be invoked until slave set B begins to generate output. Slave set B must sort and merge the rows received from slave set A. Therefore, output from slave set B cannot occur until after slave set A has processed all of the rows in the employee and department tables. Therefore, once slave set A finishes processing the DFOs in set A, slave set A is available to implement the DFOs in set C. Therefore, the implementation of tree 350 only requires two slave sets (slave set A and B).

Referring to FIG. 6B, information sent to query slaves include the output TQ identifier, the number of rowid-partitioned tables, the size of the SQL statement representing the DFO, the SQL statement representing the DFO, and flags that define runtime operations (e.g., slave must send "Started" message, slave sends "Ready" message when input consumed, and close slave expects to be closed upon completion).

Additional row sources facilitate the implementation of the parallelism of the present invention. These include parallelizer, table queue, table access by partition, and index creation row sources. An index creation row source assembles sub-indices from underlying row sources. The sub-indices are serially merged into a single index. Row sources for table and index scanning, table queues, and remote tables have no underlying row sources, since they read rows directly from the database, a table queue, or a remote data store.

A table queue is a mechanism for partitioning and transporting rows between sets of processes. The input TQ function of a table queue is determined by the partitioning type of the parent DFO. The following are examples of some considerations that can be used to determine the type of TQ partitioning:

1. The inputs to a DFO must be hash partitioned, if the DFO requires value partitioning (e.g., a sort/merge join or group by), there is no orderBy in the DFO tree, and the DFO is not a nested loop join;

2. The inputs to a DFO must be range partitioned, if the DFO requires value partitioning (e.g., a sort/merge join or group by), there is an orderBy in the DFO tree, and the DFO is not a nested loop join;

3. If the DFO is a nested loop join., one input must be arbitrarily partitioned and the other input must access all of the input data either by using a broadcast TQ or a full table scan;

4. When rows are returned to the QC, partitions must be returned sequentially and in order, if the statement contains an orderBy. Otherwise, the rows returned from the partitions can be interleaved.

DATA FLOW SCHEDULER

The parallelizer row source (i.e., data flow scheduler) implements the parallel data flow scheduler. A parallelizer row source links each DFO to its parent using a TQ. If parallelism cannot be implemented because of the unavailability of additional query slaves, the parallelizer row source becomes invisible, and the serial row source tree is implemented. In this instance, the parallelizer is merely a conduit between the underlying row source and the row source to which the parallelizer is the underlying row source. In general, row sources are encapsulated and, therefore, do not know anything about the row sources above or below them.

PARALLELIZER ALLOCATION

Figure 8:
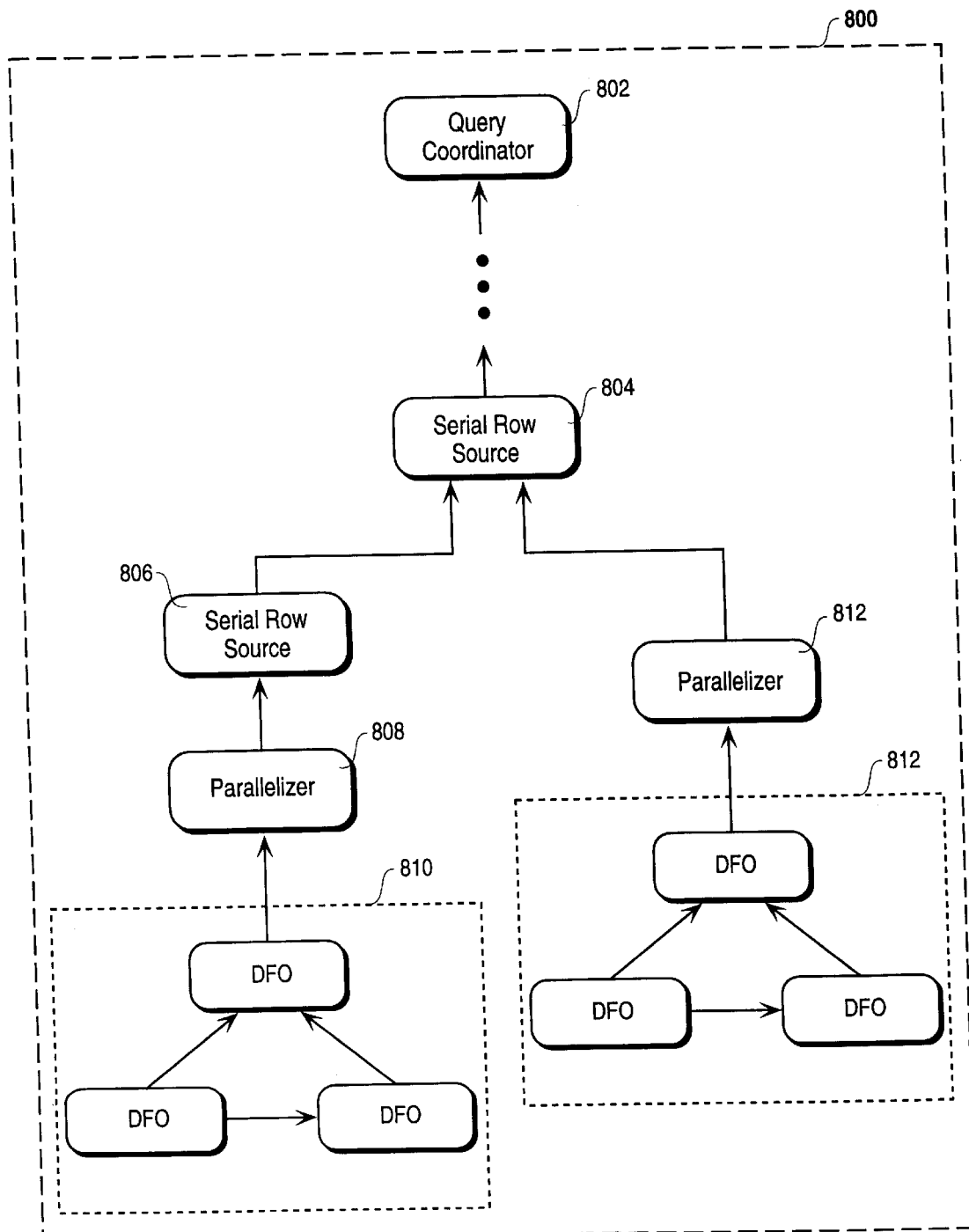
FIG. 8 illustrates a row source tree including parallelizer row sources.

At compilation, when you reach a row source that is the top of a DFO tree, or is directly below a portion of the row source tree that cannot be parallelized, a parallelizer row source is allocated between the top of the DFO tree and below the serial portion of the row source tree. FIG. 8 illustrates a row source tree including parallelizer row sources. Parallelizer 808 is allocated between DFO subtree 810 and serial row source 806. Parallelizer 812 is allocated between DFO subtree 812 and serial row source tree 804.

Figure 10A:
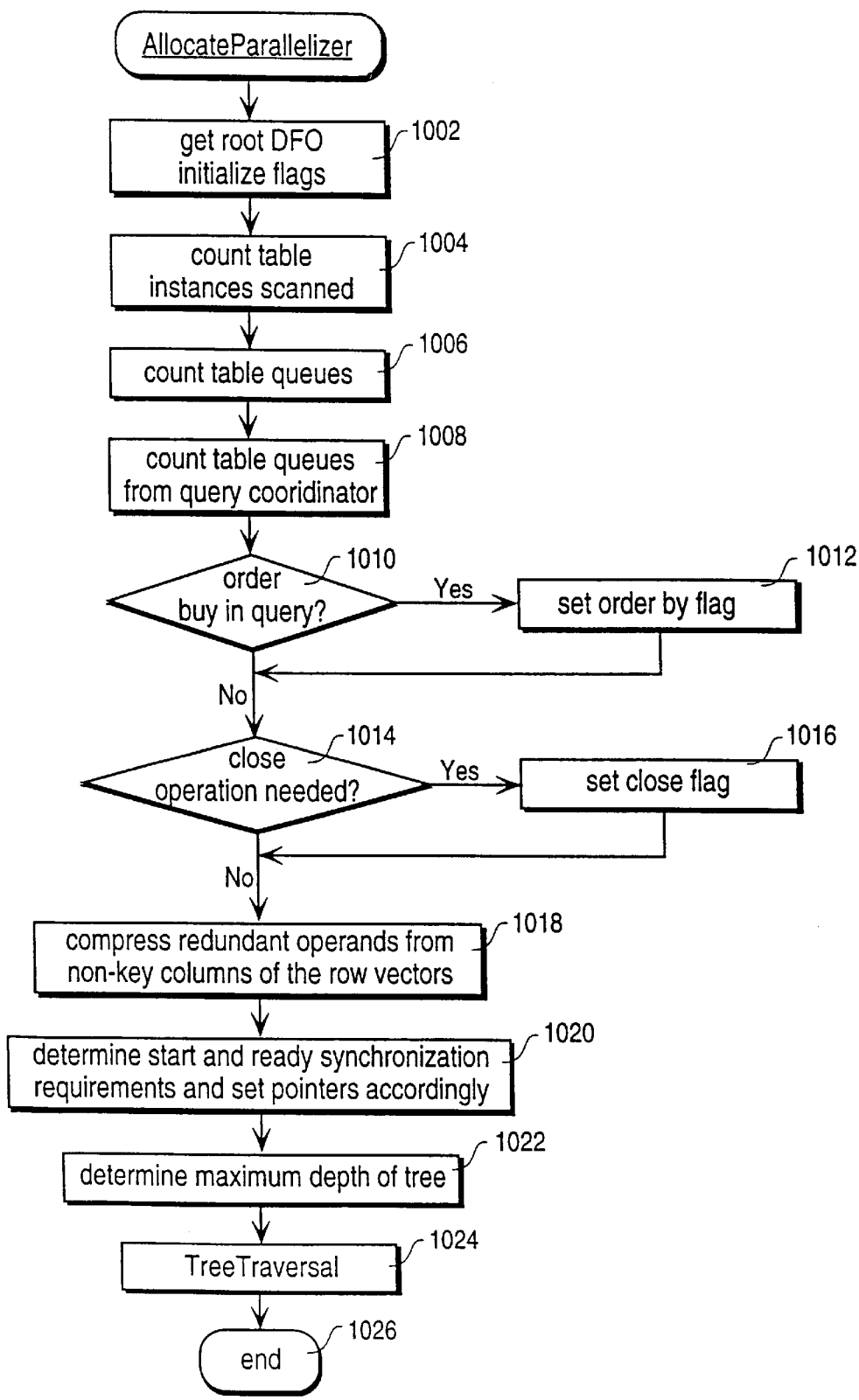
FIG. 10A provides an Allocate Parallelizer process flow.

FIG. 10A provides an Allocate Parallelizer process flow. Processing block 1002 gets the rood DFO in the DFO tree and initializes flags. At processing block 1004, the number of table instances scanned is determined. At processing block 1006, the number of table queues is determined. The number of table queues receiving rows from serially processed nodes is determined at processing block 1008.

At decision block 1010 (i.e., "orderBy in query?"), if an orderBy is present in the SQL statement being processed, an orderBy flag is set, and processing continues at decision block 1014. If an orderBy is not present in the SQL statement, processing continues at decision block 1014. At decision block 1014 (i.e., "close message needed?"), if a close message must be sent to the slaves, a close flag is set, and processing continues at processing block 1018. If no dose message is needed, processing continues at processing block 1018.

At processing block 1018, redundant columns that are not key columns are eliminated from the SQL statement(s). The start and ready synchronization requirements (i.e., whether slaves need to communicate started and ready states to the data flow scheduler) are determined and retained at block 1020. At processing block 1022, the maximum depth of the tree is determined by examining the tree. At 1024, TreeTraversal is invoked to traverse the DFO tree for which the current parallelizer row source is being allocated. Processing ends at processing block 1026.

Figure 10B:
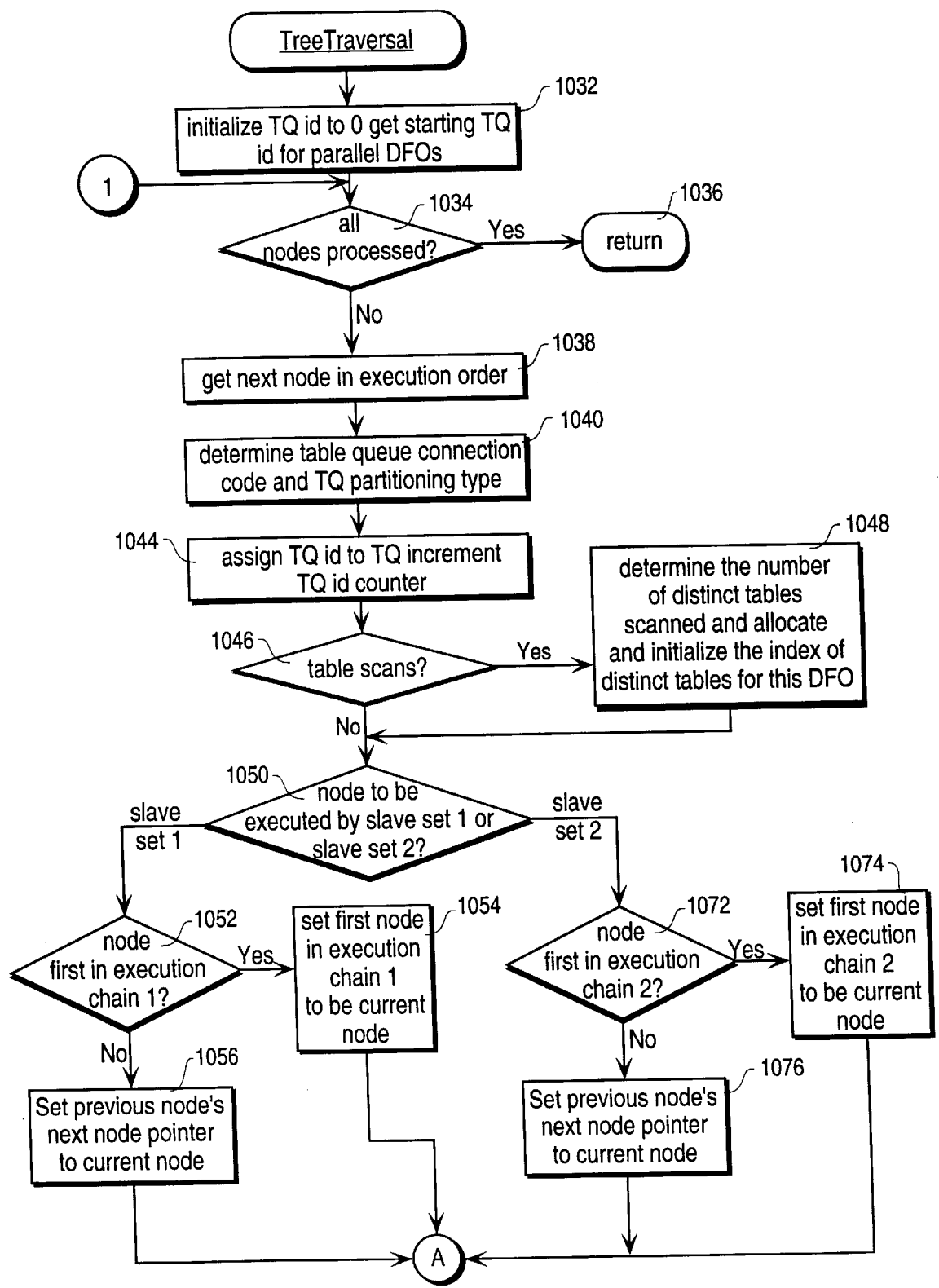
FIGS. 10B–10C provide an example of the process flow for TreeTraversal.
Figure 10C:
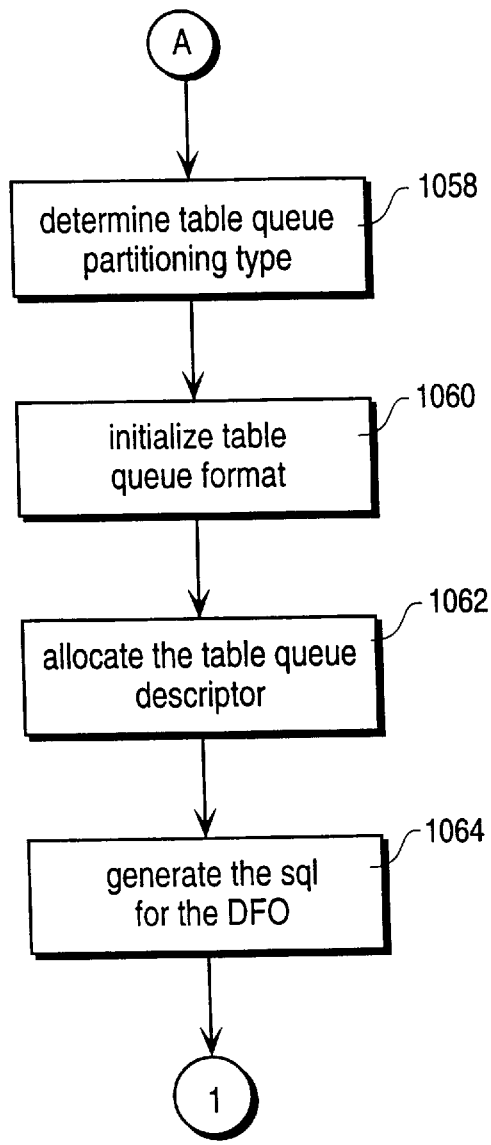

TreeTraversal is invoked to further define the execution environment for a DFO tree. FIGS. 10B and 10C provide an example of the process flow for TreeTraversal. At processing block 1032, the table queue identifier (TQ ID) is initialized to zero, and the starting TQ ID for parallel DFOs is determined. At decision block 1034 (i.e., "all nodes processed?"), if the tree has been traversed, processing returns to AllocateParallelizer at block 1036. If the traversal is not complete, processing continues at block 1038. The first, or next node in the execution order is identified at processing block 1038.

At processing block 1040, the TQ connection code (i.e., from slave set 1 to slave set 2, or from slave set 2 to slave set 1, or from QC to slave set 1, or from slave set 1 to QC, or from QC to slave set 2, or from slave set 2 to QC) is determined, and the TQ's partitioning type is determined. At processing block 1044, a TQ ID is assigned to the TQ, and the TQ ID counter is incremented. At decision block 1046 (i.e., "table scans?"), if there are no table scans in the DFO, processing continues at decision block 1046. If there are table scans, the number of distinct tables scanned is determined, and the index of distinct tables for this DFO is allocated and initialized at processing block 1046. Processing continues at decision block 1050.

At decision block 1050 (i.e., "node to be executed by slave set 1 or slave set 2?"), if the node is executed by slave set 1, processing continues at decision block 1052. At decision block 1052 (i.e., "node first in execution chain 1?"), if the node is the first to be executed in the first chain, this node is set as the current node at processing block 1054, and processing continues at block 1058. If the node is not the first to be executed, the next node pointer of the previous node in this chain is set to point to the current node at processing block 1056, and processing continues at block 1058.

If, at decision block 1050, the node is to be executed by slave set 2, processing continues at decision block 1072. At decision block 1072 (i.e., "node first in execution chain 2?"), if the node is the first to be executed in the second chain, this node is set as the current node at processing block 1074, and processing continues at block 1058. If the node is not the first to be executed, the next node pointer of the previous node in this chain is set to point to the current node at processing block 1076, and processing continues at block 1058.

At processing block 1058, the partitioning type for the TQ is determined. At processing block 1060, the table queue format is initialized. At processing block 1062 the table queue descriptor is allocated . At processing block 1062, the table queue descriptor contains information regarding the TQ including the TQ ID, partitioning type, and connection code. The SQL for the DFO is generated at processing block 1064. Processing continues at decision block 1034 to process any remaining nodes of the tree.

PARALLELIZER INITIATION

After an SQL statement is compiled and an execution plan is identified, the SQL statement can be executed. To execute an SQL statement, execution begins from the top of the row source tree. From the root down, each node is told to perform one of its operations (e.g., open, fetch, or close). As each node begins its operations, it must call upon its underlying nodes to perform some prerequisite operations. As the tree is traversed in this manner, any parallelizer row sources that are encountered are called upon to implement its functionality (i.e., start).

Figure 18A:
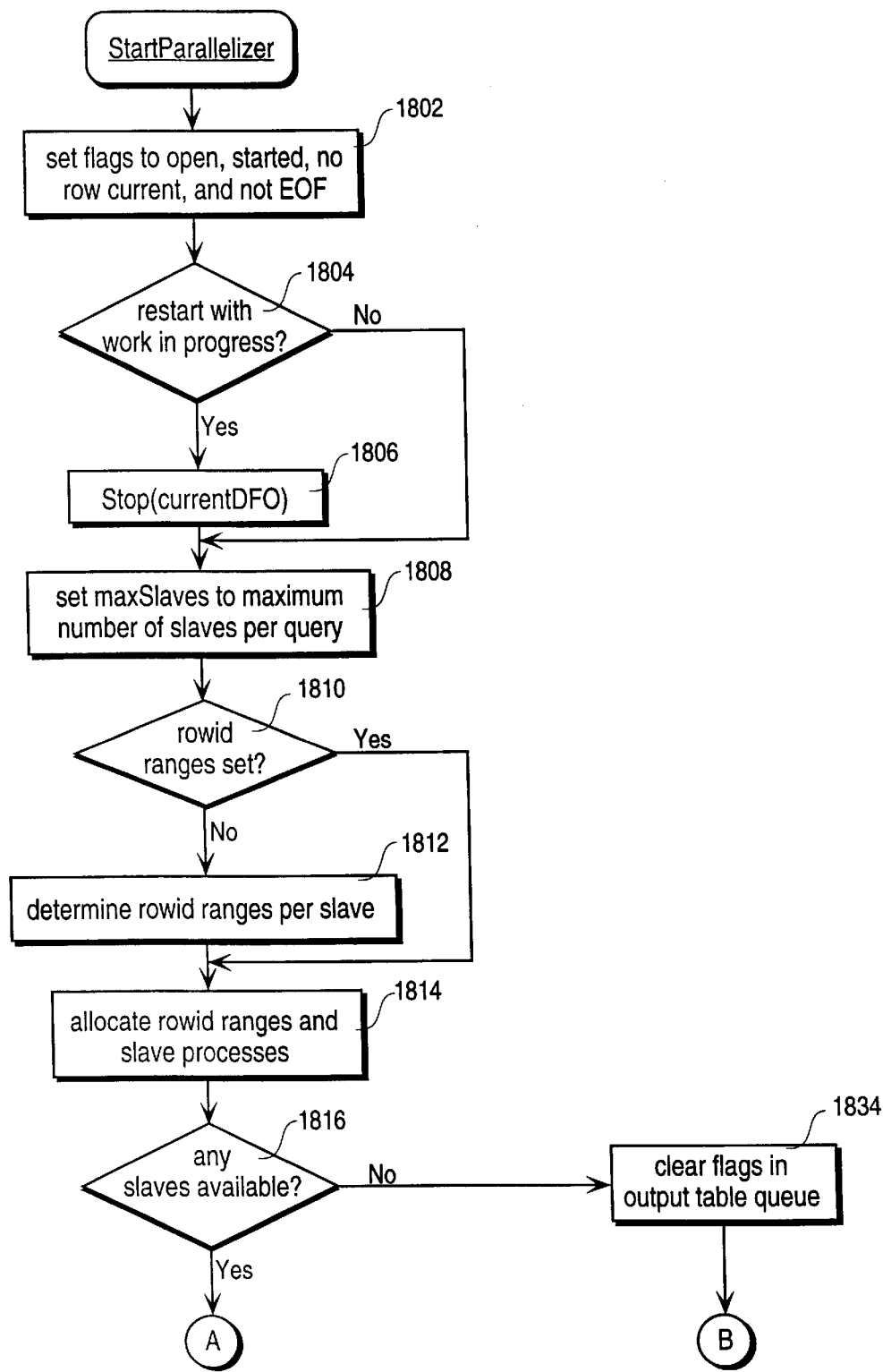
FIG. 18 illustrates a StartParallelizer process flow.
Figure 18B:
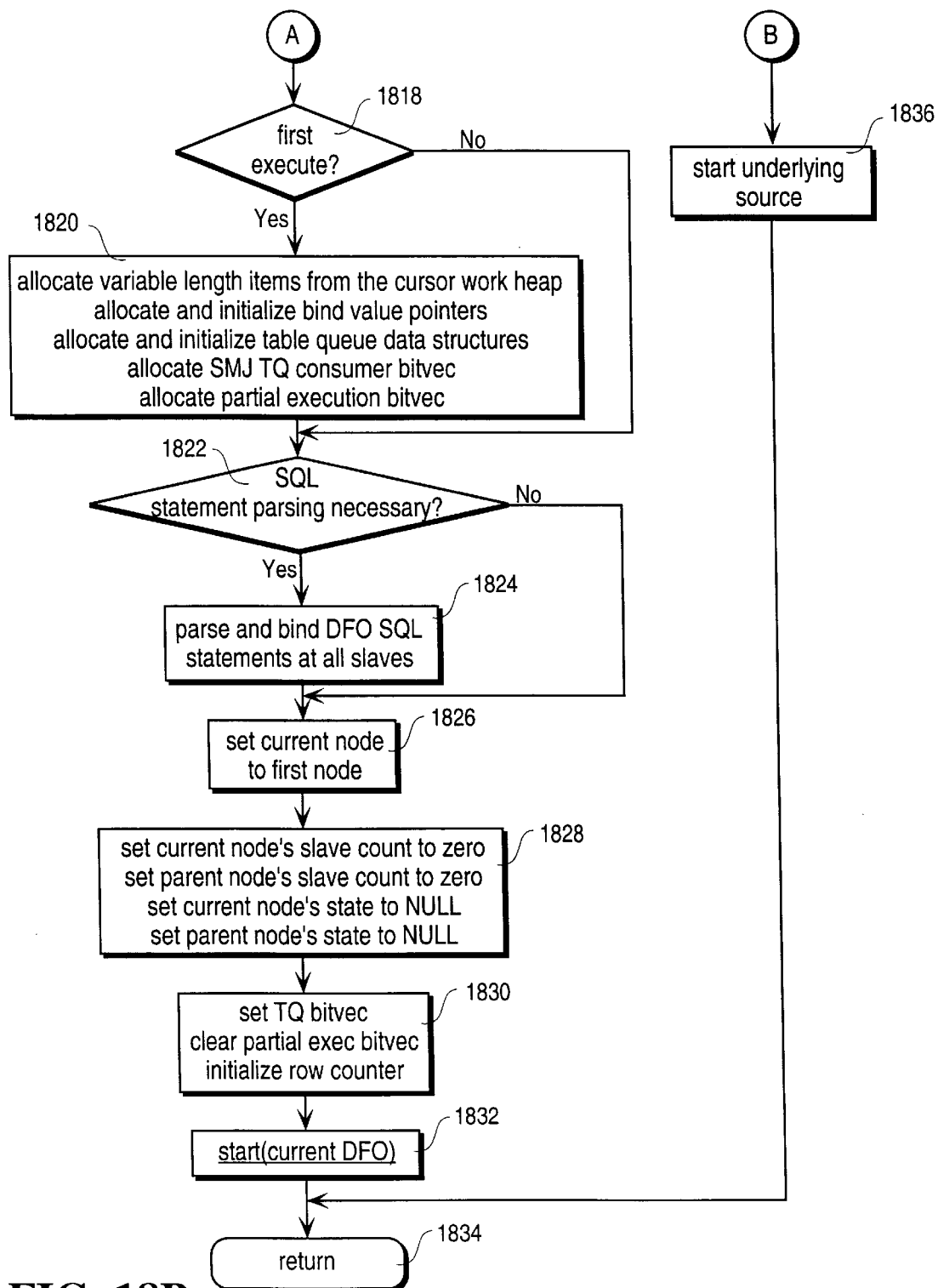

Operations (e.g., fetching rows from DBMS) can be performed more than once. This results in multiple calls to a parallelizer. When a parallelizer is called after a first call to the parallelizer, the parallelizer must be able to determine the state of the slaves implementing the underlying DFO tree (e.g., the state of the slaves, what DFOs are running). StartParallelizer, illustrated in FIGS. 18A and 18B, provides an example of the steps executed when a parallelizer row source is called.

At block 1802, flags are initialized (e.g., opened, started, no row current, and not end of fetch). At decision block 1804 (i.e., "restart with work in progress?"), if the parallelizer was not restarted with work in progress, processing continues at block 1808. Processing continues at block 1808 to set the maximum number of slaves to the maximum number of slaves allowed (i.e., based on a system's limitations) per query.

At decision block 1810 (i.e., "rowid ranges set?"), if rowid ranges are set, processing continues at block 1814. If the rowid ranges have not been set, processing continues at block 1812 to allocate rowid ranges per slave, and processing continues at block 1814. At processing block 1814, the rowid ranges and the slave processes to implement the underlying DFO tree are allocated. At decision block 1816 (i.e., "any slaves available?"), if no slaves are available for allocation to perform the parallelism of the underlying DFO tree, processing continues at block 1834 to clear flags in output TQ, and at 1836 to start the underlying serial row source. Thus, where system limitations do not permit any parallelism, the parallelizer initiates the serial row source tree to implement the functionality of the parallel DFO tree. Processing returns at block 1834.

If some amount of parallelism is available, processing continues at decision block 1818. At decision block 1818 (i.e., "first execute?"), if this is the first execution of the parallelizer, processing continues at block 1820 to initialize working storage (e.g., allocate variable length items from the cursor work heap, allocate and initialize bind value pointers, allocate and initialize TQ data structures, allocate SMJ TQ consumer bit vector, and allocate partial execution bit vector). Processing continues at decision block 1822.

If this is not the first execution of the parallelizer, processing continues at decision block 1822. At decision block 1822 (i.e., "SQL statement parsing necessary?"), if the parsing is required, processing continues at block 1824 to compile and bind DFO SQL statement at all of the slaves. Processing continues at block 1826. If parsing is not necessary, processing continues at block 1826.

At block 1826, the current node is set to the first node to be executed (i.e., the bottom-most, left-most node of the DFO tree). At block 1828, the current node's and its' parent's slave count is set to zero, the current node's and its' parent's state is set to NULL. At block 1830, the TQ bit vector is set, the partial execution bit vector is cleared, and the row counter is set to zero. At 1832, Start is invoked to start the current DFO. Processing ends at block 1834.

Start Node

Figure 15:
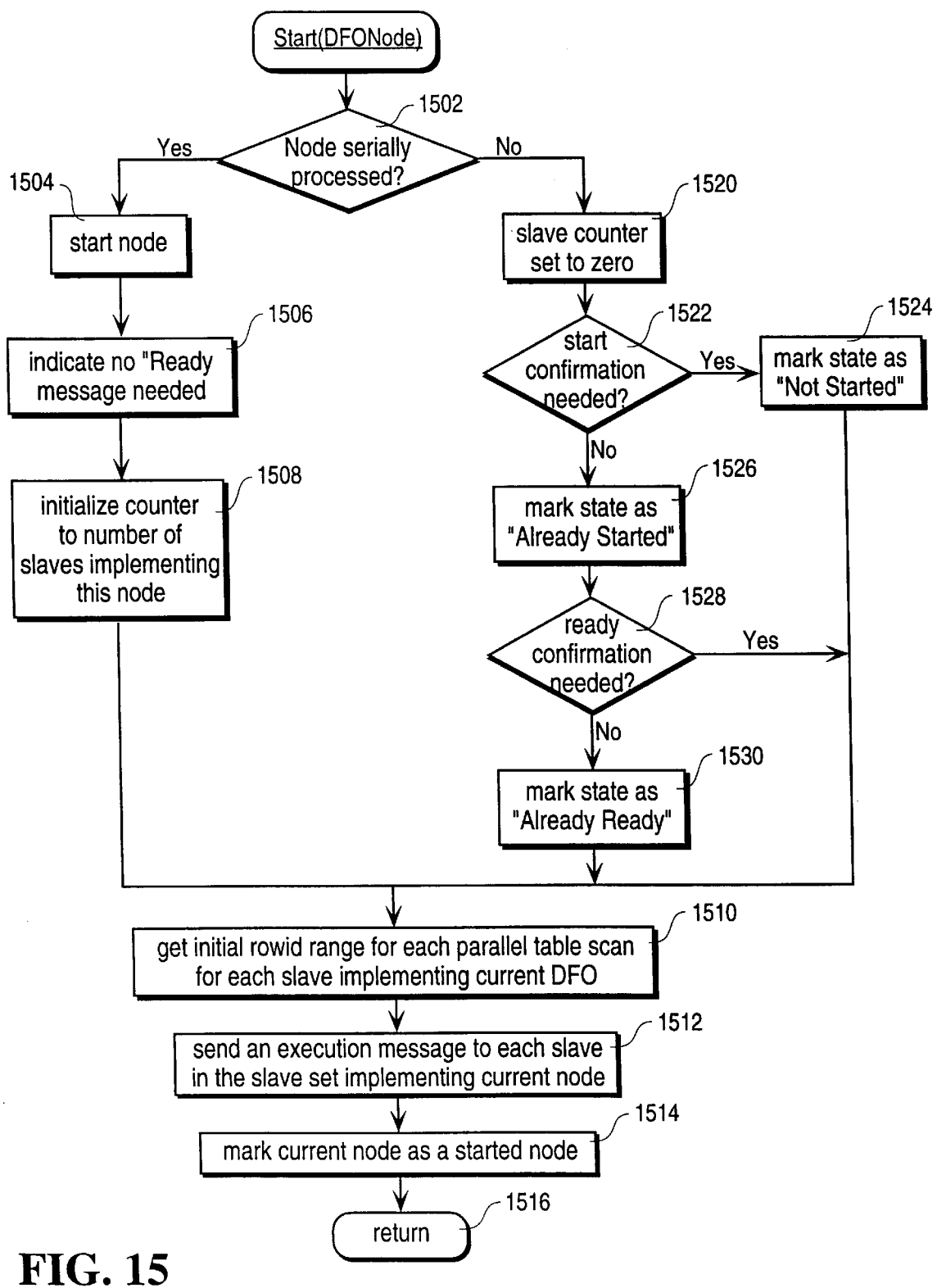
FIG. 15 illustrates a process flow for Start.

At various stages of implementation of a DFO tree, the parallelizer (i.e., data flow scheduler) traverses the DFO tree, using the DFO tree pointers, to find the next node to implement. When a node is identified that is not already started, the parallelizer starts the node. FIG. 15 illustrates a process flow for Start.

At decision block 1502 (i.e., "Nodes serially processed?"), processing continues at block 1504. At block 1504, the node is started. At block 1506, the fact that no ready message is needed is indicated (i.e., slaves will continue to process without ready synchronizations from the parallelizer). The counter is set to the number of slaves implementing the node at block 1508. Processing continues at block 1510.

If, at decision block 1502, parallelism can be used to implement the node, processing continues at block 1520. At block 1520, the slave counter is set to zero. At decision block 1522 (i.e., "start confirmation needed?"), if it is determined that a start confirmation is necessary, a flag is set to mark the state as "Not Started" at block 1524, and processing continues at block 1510.

If no start confirmation is needed, processing continues at block 1526 to mark state as already started. At decision block 1528 (i.e., "ready confirmation needed?"), if ready confirmation is needed, processing continues at block 1510. If it is not needed, the state is marked as already ready, and processing continues at block 1510.

At block 1510, an initial rowid range of each parallel table scan is obtained for each slave implementing the current DFO. At block 1512, an execution message is sent to all of the slaves that are implementing the current node. At block 1514, the current node is marked as started. Processing returns at block 1516.

SORCERER'S APPRENTICE

The present invention provides the ability to eliminate needless production of rows (i.e., the sorcerer's apprentice problem). In some cases, an operation is dependent on the input from two other operations. If the result of the first input operation does not produce any rows, there is no need for the second input generator to produce any rows. However, unless these input generators are aware of the fact that there is no need to continue processing, they will execute their operations.

For example, a sort/merge join operation is dependent on the output of two separate underlying operations. If the execution of the first underlying operation does not produce any rows, there is no need to execute any remaining operations in the sort/merge join task. However, unless the processes executing the remaining underlying input are aware of the fact that there is no need to continue processing, they will continue to process despite the fact that there is no need to continue.

This problem is further complicated when multiple processes are involved (e.g., multiple slaves performing the first table scan) because some of the processes may produce rows while others do not produce rows. Therefore, it is important to be able to monitor whether any rows are produced for a given consumer. The producers of the rows can't be used to perform the monitoring function because the producers are not aware of the other producers or where the rows are going. Therefore, the consumer of the rows (i.e., the sort/merge join processes) must monitor whether any rows are received from the producers.

A bit vector is used to indicate whether each consumer process received any rows from any producer slaves. Each consumer is represented by a bit in the bit vector. When all of the end of fetch ("eof") messages are received from the producers of a consumer slave, the consumer sends a done message to the data flow scheduler. The data flow scheduler determines whether the consumer slave received any rows, and sets the consumer's bit accordingly. The bit in the bit vector is used by subsequent producers to determine whether any rows need to be produced for any of its consumers. The bit vector is reset at the beginning of each level of the tree.

Figure 9:
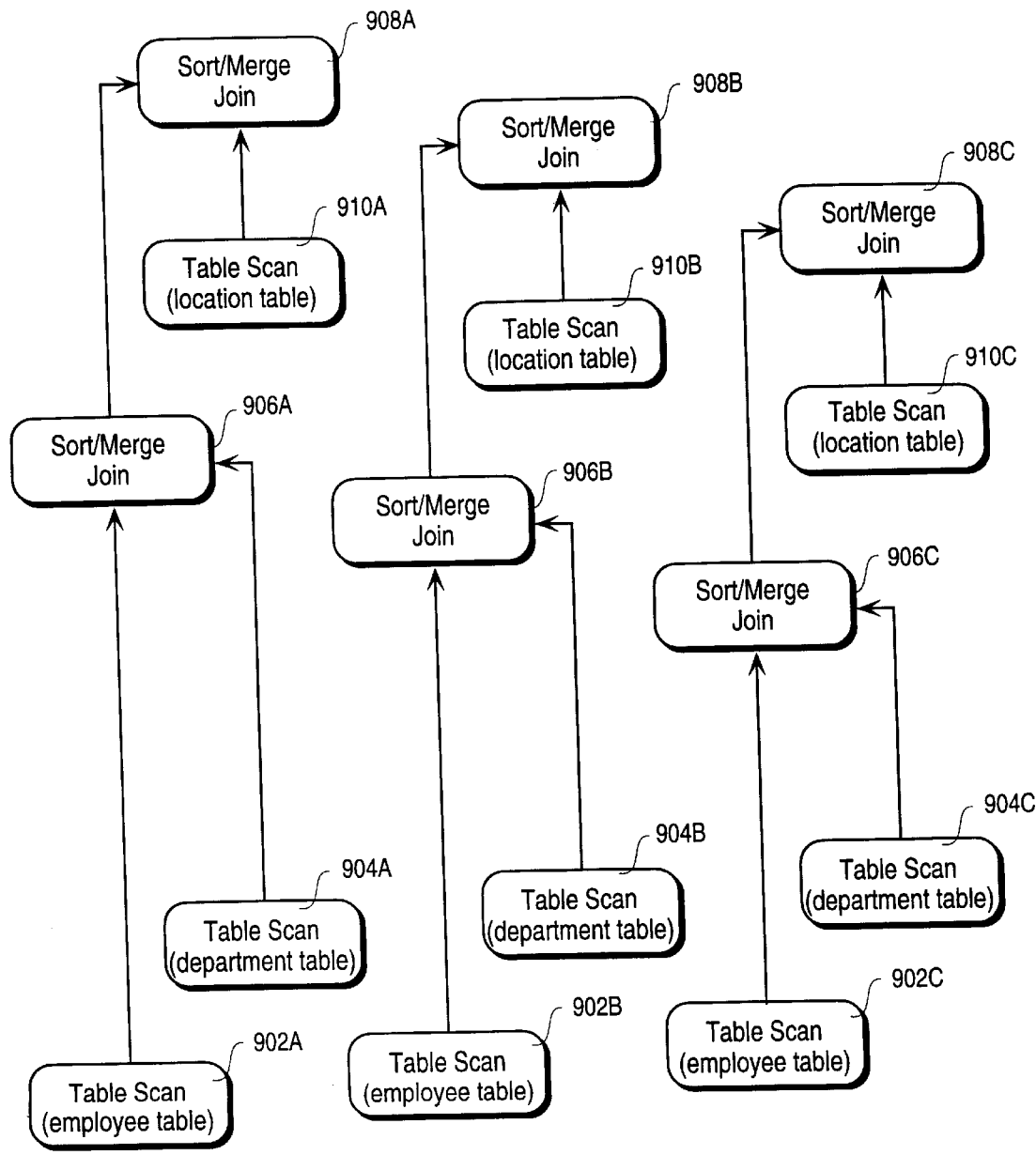
FIG. 9 illustrates a three way join.

FIG. 9 illustrates a three way join. Employee table scan is implemented by slave DFOs 902A–902C in the first slave set. Rows produced by slave DFOs 902A–902C in the first set are used by the second slave set implementing the first sort/merge join (i.e., slave DFOs 906A–906C, respectively). The second set of input to sort/merge join slave DFOs 906A–906C is generated by department table scan slave DFOs 904A–906C in the first set, respectively. As slave DFOs 902A–902C complete, the sorcerer's apprentice bit vector is set to indicate whether any or none of slave DFOs 902A–902C produced any rows. If none of these slave DFOs produced any rows, there is no need to continue processing. Further, if slave DFOs 902A–902C did not produce any rows for consumer slave DFO 906C, there is no need for slave DFOs 904A–904C to send any output to consumer slave DFO 906C. Therefore, subsequent slave processes (e.g., 904C, 906C, 908C, or 910C) can examine the bit vector to determine what consumer slave DFOs should be serviced with input. The bit vector is updated to reflect a subsequent consumer slave's receipt (or lack thereof) of rows from their producer slaves, and examined by subsequent producer slave processes to determine whether to process rows for their consumer slaves.

PARALLELIZER EXECUTION

After a parallelizer has been initiated, its operations include synchronizing the parallel execution of the DFO tree. It allocates the DFOs in the DFO tree to the available slaves and specifies table queue information where appropriate. Like other row sources, the parallelizer row source can perform open, fetch, and close operations.

The data flow scheduler keeps track of the states of two DFOs at a time (i.e., the current DFO and the parent of the current DFO). As the slaves asynchronously perform the tasks, transmitted to them by the dataflow scheduler, they transmit state messages to the dataflow scheduler indicating the stages they reach in these tasks. The data flow scheduler tracks the number of slaves that have reached a given state, and the state itself. The counter is used to synchronize the slaves in a slave set that are performing a DFO. The state indicates the states of slaves implementing a DFO. For example, a started state indicates that a slave is started and able to consume rows. A ready state indicates that a slave is processing rows and is about to produce rows. A partial state indicates that a slave is finished with the range of rowids, and needs another range of rowids to process additional rows. Partial state is the mechanism by which slave processes indicate to the QC that they need another rowid range to scan. Done indicates that a slave is finished processing.

Some states are optional. The need for a given state is dependent on where the DFO is positioned in the DFO tree, and the structure of the DFO. All DFOs except the DFO at the top of the DFO tree must indicate when they are ready. Every DFO except the leaves of the DFO tree must indicate when they have started. A DFO that is a producer of rows reaches the ready state. Only table scan DFOs reach the partial state. A DFO that consumes the output of another DFO reaches the started state. Child DFOs that have a parent reach the done state.

EXAMPLE

Referring to FIG. 3C, each dataflow scheduler starts executing the deepest, leftmost leaf in the DFO tree. Thus, the employee scan DFO directs its underlying nodes to produce rows. Eventually, the employee table scan DFO is told to begin execution. The employee table scan begins in the ready state because it is not consuming any rows. Each table scan slave DFO SQL statement, when parsed, generates a table scan row source in each slave.

When executed, the table scan row source proceeds to access the employee table scan in the DBMS (e.g., performs the underlying operations required by the DBMS to read rows from a table), gets a first row, and is ready to transmit the row to its output table queue. The slaves implementing the table scan replies to the data flow scheduler that they are ready. The data flow scheduler monitors the count to determine when all of the slaves implementing the table scan have reached the ready state.

At this point, the data flow scheduler determines whether the DFO that is currently being implemented is the first child of the parent of this DFO. If it is, the data flow scheduler sends an execute to a second slave set to start the sort/merge join (SMJ) DFO (i.e., 324A–324C). The slaves executing the SMJ DFO (i.e., 324A–324C) will transmit a "started" message. When the data flow scheduler has received a "started" message from all of the SMJ slaves (i.e., "n" slaves where "n" is the number of table scan and SMJ slaves), the data flow scheduler sends a resume to the table scan slaves. When the table scan slaves receive the resume, they begin to produce rows.

During execution, the table scan slaves may send a partial message. A partial message means that a slave has reached the end of a rowid range, and needs another rowid range to scan another portion of the table. The data flow scheduler does not have to wait for the other table scan slaves to reach this state. The data flow scheduler determines whether any rowid ranges remain. If there are no remaining rowid ranges, the data flow scheduler sends a message to the table scan slave that sent the "partial" message that it is finished. If there are more rowid ranges, the data flow scheduler sends the largest remaining rowid range to the table scan slave.

When each of the table scan slaves finish their portions of the scan, they send an "end of fetch" ("eof") message to the slaves that are executing the SMJ DFO via the table queue. When the SMJ DFO receives the "eof" messages from all of the table scan slaves, the SMJ DFO will report to the data flow scheduler that all of the table scan slaves are done. Once it is determined that all of the employee table scan has been completed, the data flow scheduler determines the next DFO to be executed.

The next DFO, the department table scan, is started. The same slave set is used to scan both the employee table and the department table. The department table scan slave DFOs (i.e., 344A–344C) will reach the ready state in the same way that the employee table scan reached ready. At that point, the data flow scheduler must determine whether the department table scan is the first child of its parent.

In this case, the department table scan DFO is not (i.e., the employee table scan DFO was the first child of the parent of the department table scan). Therefore, the parent DFO has already been started, and is ready to consume the rows produced by the department table scan slaves. Therefore, the data flow scheduler sends a "resume" to the department table scan slaves. The department table scan slaves will execute the department table scan sending "partial" messages, if applicable.

Once an "eof" message is received from all of the slaves implementing the department table scan, the SMJ DFO slaves can consume all of its inputs from the employee and department table scans, and will become ready to produce a row. At this point, the SMJ DFO slaves can transmit a "ready" message to the data flow scheduler.

Once the data flow scheduler receives a "ready" message from the all of the slaves (i.e., count is equal to the number of slaves implementing the SMJ DFO), the data flow scheduler must determine whether the SMJ DFO has parent. If so, the data flow scheduler must determine whether the SMJ DFO is the first child of its parent. If it is, the data flow scheduler must send a "execute" message to the slaves implementing the OrderBy DFO. In this case, the SMJ DFO is the first child of the OrderBy DFO (i.e., 322A–322C). Therefore, the data flow scheduler starts the OrderBy DFO. Because the set of slave that implemented the table scans are done, the OrderBy DFO can be implemented by the same set of slaves that implemented the table scan DFOs.

Once the OrderBy DFO has started, it sends a "started" message to the data flow scheduler. When the data flow scheduler has received "started" messages from all of the OrderBy DFO slaves, it can send a "resume" message to the SMJ DFO slaves. The SMJ DFO begins to produce rows for consumption by the OrderBy slaves. As each SMJ DFO finishes, they send "eof" messages to the OrderBy DFO. Once the OrderBy DFO receives an "eof" from all of the SMJ DFO slaves, the OrderBy DFO sends a message to the data flow scheduler. Because the OrderBy DFO is at the top of the tree, it does not have to go through any other states. Therefore, it can continue to output rows.

Fetch Operation

Figure 11A:
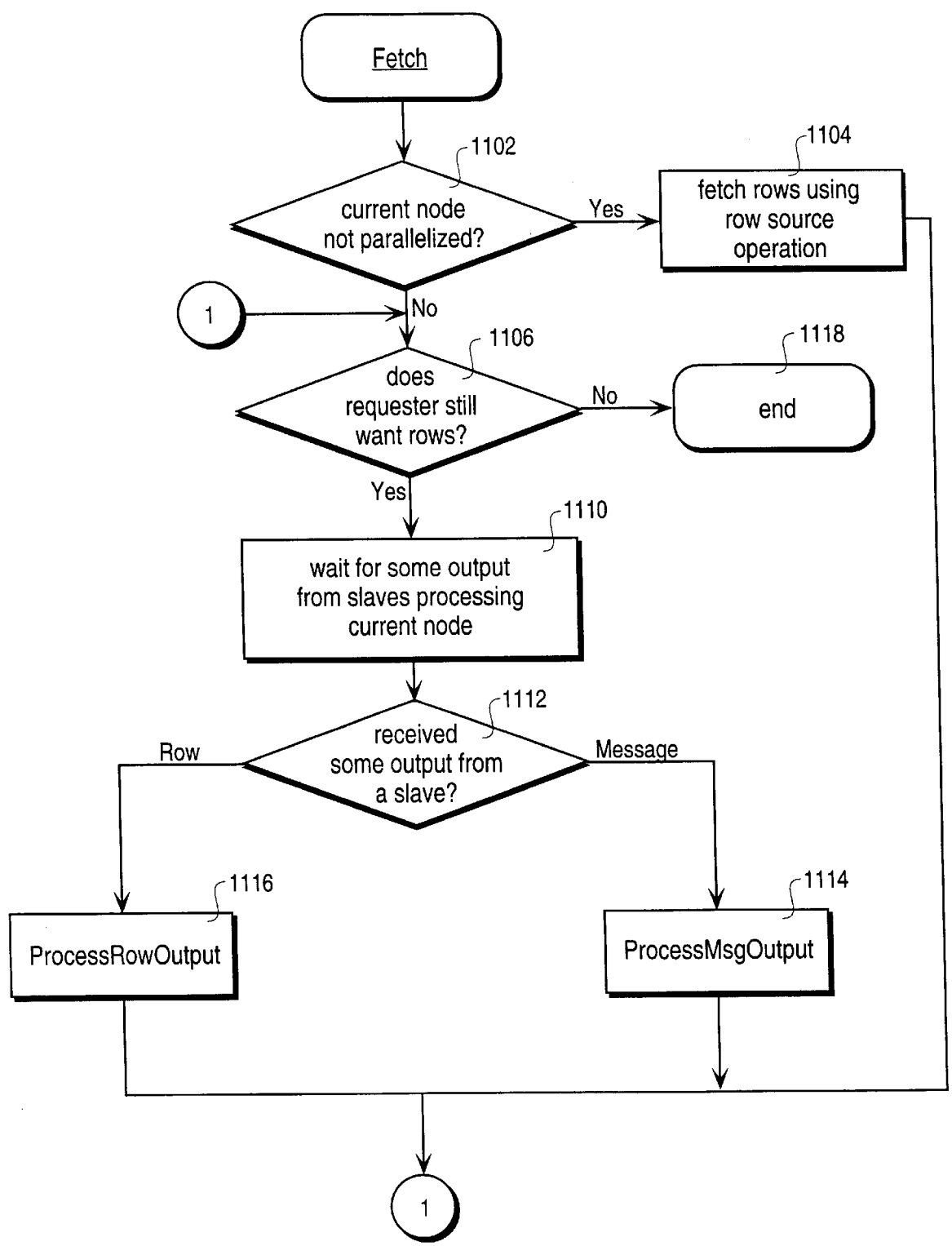
FIG. 11A illustrates a process flow for Fetch.

When a data flow scheduler receives a request for one or more rows, it executes its fetch operation. FIG. 11A illustrates a process flow for Fetch. At decision block 1102 (i.e., "current node not parallelized?"), if the current node is not parallelized, the row source operation is executed serially to satisfy the fetch request at block 1104. The data flow scheduler's fetch operation ends at block 1118.

If, at decision block 1102, it is determined that the current node is parallelized, processing continues at decision block 1106. At decision block 1106 (i.e., "does requester still want rows?"), if the requester no longer wants rows, processing ends at block 1118. If the requester still wants rows, processing continues at block 1110. At block 1110, the data flow scheduler waits for some output from the slaves processing the current node.

At decision block 1112 (i.e., "received some output from a slave?"), if one or more rows are output from the slaves processing continues at processing block 1116 to invoke ProcessRowOutput. If, at decision block 1112, the output is message output, processing continues at block 1114 to invoke ProcessMsgOutput. In either case, after the output is addressed, processing continues at decision block 1106 to determine if more rows are requested by the requester.

ProcessRowOutput

Figure 11B:
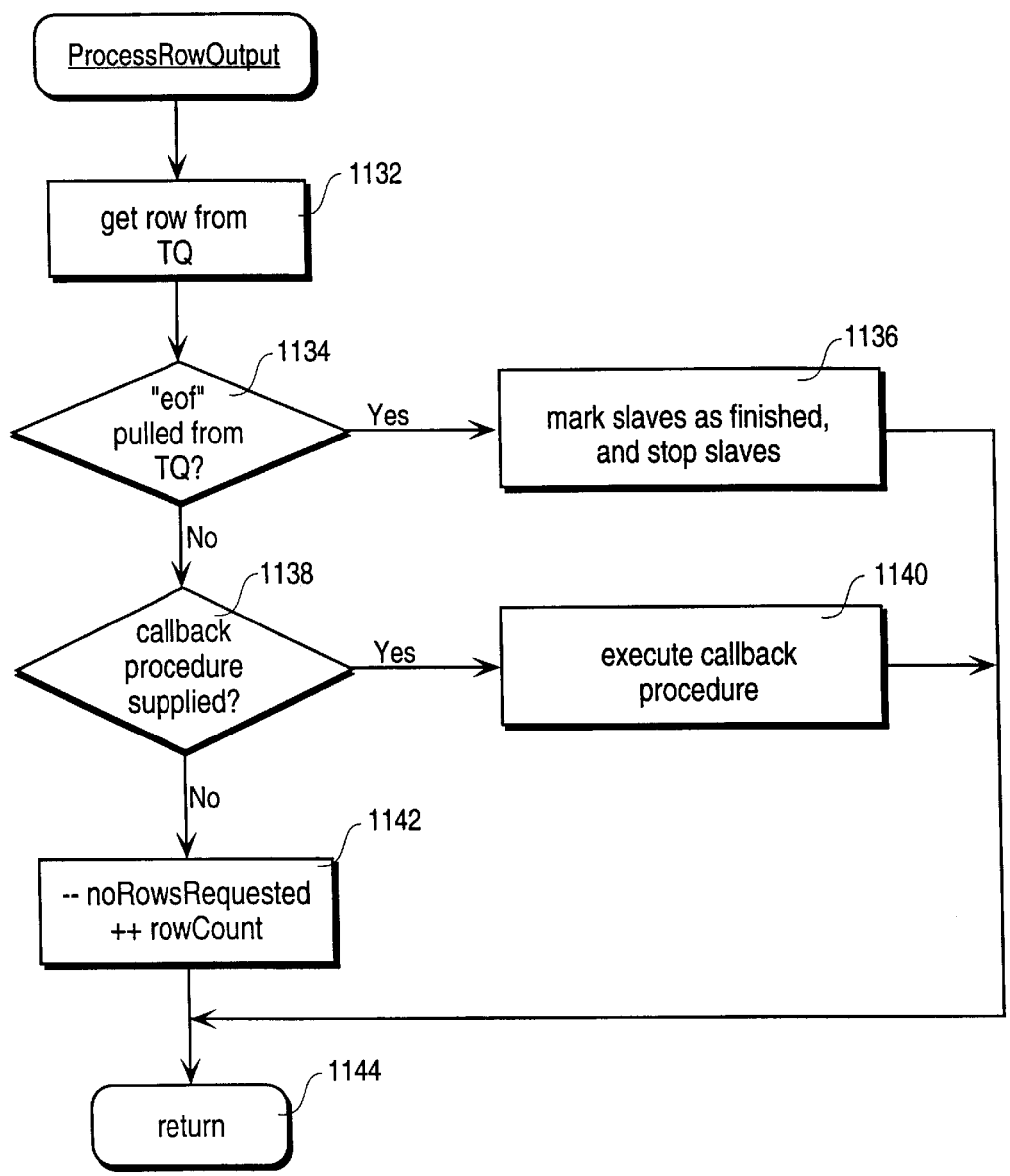
FIG. 11B provides an example of the process flow of ProcessRowOutput.

When the data flow scheduler determines that slaves have generated rows (e.g., output rows to a TQ), the data flow scheduler monitors the output using ProcessRowOutput. FIG. 11B provides an example of the process flow of ProcessRowOutput. At block 1132, the output is accessed in the output TQ. At decision block 1134 (i.e., "'eof' pulled from TQ?"), if the TQ output is an end of fetch, data flow scheduler marks all slaves as being finished, and stops the slaves at processing block 1136, and processing returns to Fetch at block 1144. If the output is not an "eof," processing continues at decision block 1138.

At decision block 1138 (i.e., "callback procedure supplied?"), if the requester supplied a callback routine to be used when rows have been produced, the data flow scheduler executes the callback routine, and processing returns to Fetch at block 1144. If there is no callback routine, processing continues at processing block 1142 to decrement the number of rows to be supplied, and the number of rows supplied. Processing returns to Fetch at block 1144.

ProcessMsgOutput

Figure 11C:
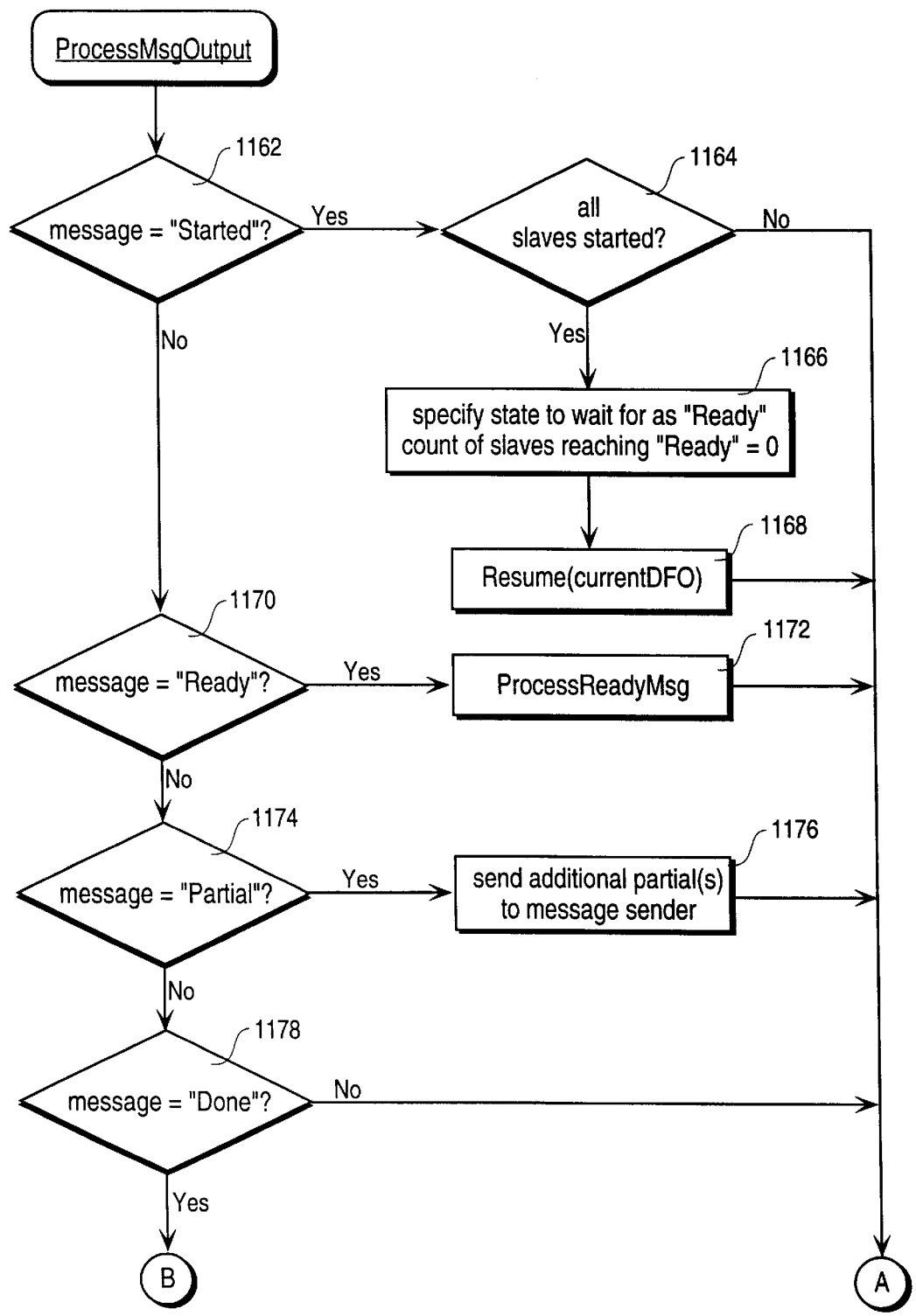
FIGS. 11C–11D illustrate a process flow of ProcessMsgOutput.
Figure 11D:
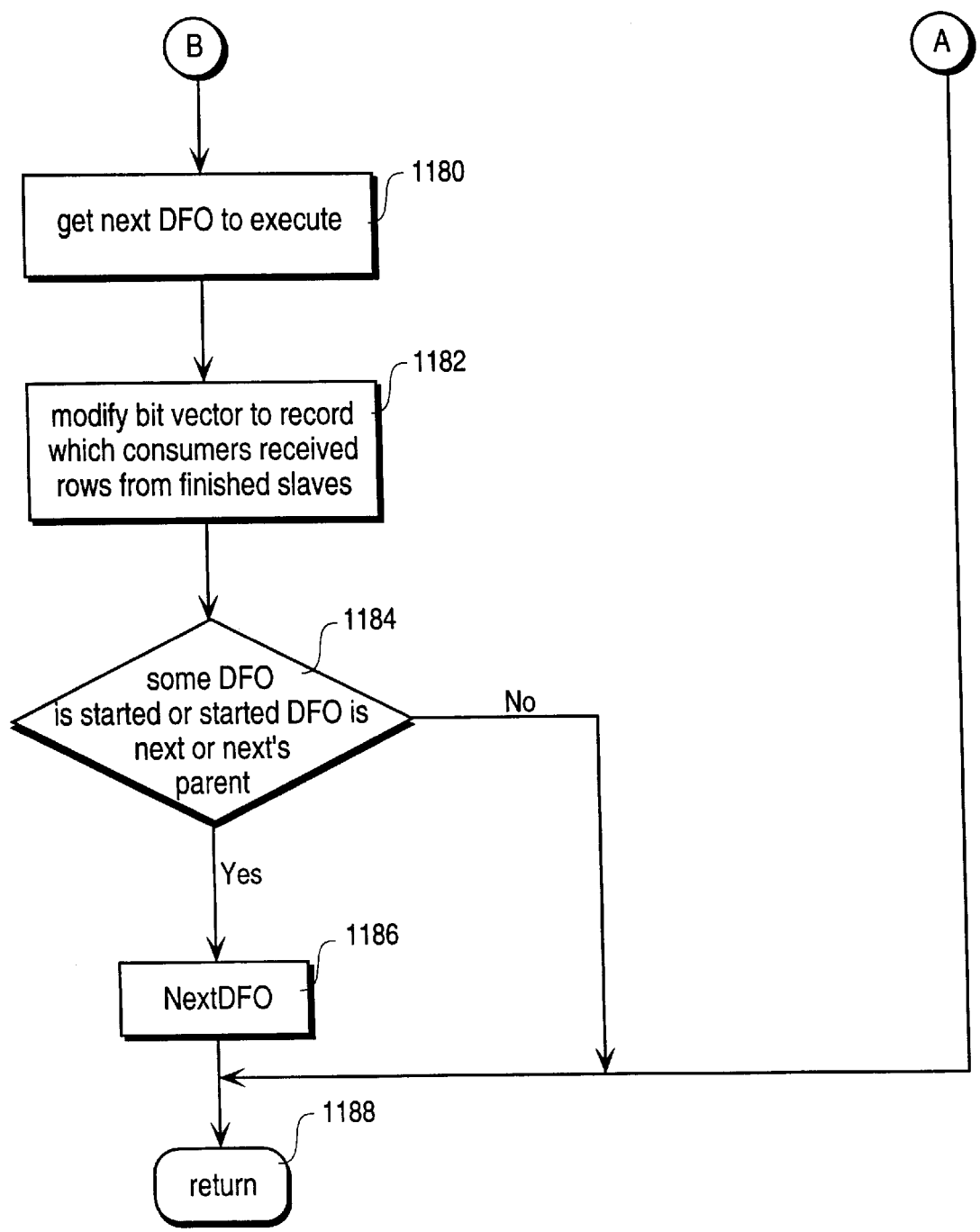

The slaves executing the operations synchronized by the data flow scheduler send messages to the data flow scheduler to request additional direction, or to communicate their states. When the data flow scheduler receives these messages, it processes them using ProcessMsgOutput. FIGS. 11C and 11D illustrate a process flow of ProcessMsgOutput. At decision block 1162 (i.e., "Message='Started'?"), if the message received from a slave is "Started," processing continues at decision block 1164. If, at decision block 1164 (i.e., "all slaves started?"), the data flow scheduler has not received the "Started" message from all of the slaves processing returns to Fetch at 1188.

If the data flow scheduler has received the "Started" message from all of the slaves, processing continues at block 1166. At processing block 1166, the slaves' next state becomes "Ready," and the data flow scheduler specifies that none of the slaves have reached that state. After each slave has sent "Started" message to the data flow scheduler, they wait for a "Resume" message in return. At processing block 1168, the data flow scheduler sends a resume to the slaves, and processing returns to Fetch at block 1188.

If, at decision block 1162, the output was not a start message, processing continues at decision block 1170. At decision block 1170 (i.e., "Message='Ready'?"), if the output is a ready message, processing continues at block 1172 to invoke ProcessReadyMsg. After the ready message is processed by ProcessReadyMsg, processing returns to Fetch at block 1188.

If, at decision block 1170, the output was not a ready message, processing continues at decision block 1174. At decision block 1174 (i.e., "Message='Partial'?"), if the message was a "Partial," the slave has completed processing a table scan using a range, and is requesting a second range designation to continue scanning the table. At processing block 1176, the data flow scheduler sends a remaining range specification (if any) to the slave, and processing returns to Fetch at block 1188.

If, at decision block 1174, the message was not a partial message, processing continues at decision block 1178. At decision block 1178 (i.e., "Message='Done'?), if the message is not a done message, processing returns to Fetch at 1188. If the message was a done message, processing continues at block 1180 to get the next DFO to be executed. At processing block 1182, the bit vector is modified to record which consumers of the rows received rows from the finished slaves.

At decision block 1184 (i.e., "all slaves done and some DFO is started or started DFO is next of next's parent?"), processing continues at block 1186 to invoke NextDFO to begin the next DFO, and processing returns to Fetch at block 1188. If all of the slaves are not done or the started DFO is not ready, processing waits until the started DFO becomes ready, and returns to Fetch at block 1188.

Resume

Figure 12:
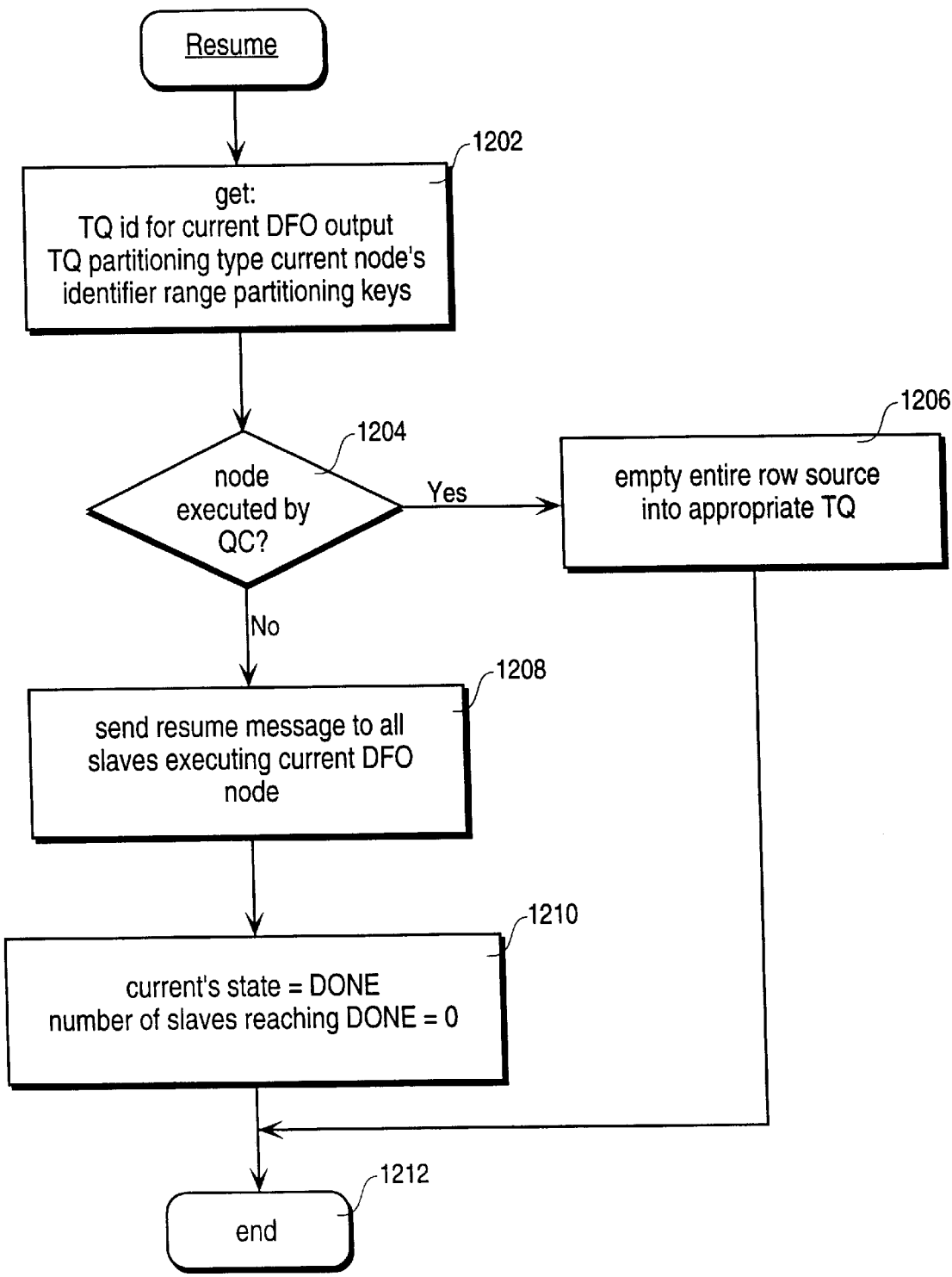
FIG. 12 illustrates a Resume process flow.

When a slave reports a ready for the current DFO, or a slave reports a started for the parent of the current DFO to the data flow scheduler, the data flow scheduler responds to the slave with a resume message to allow the slave to continue processing. FIG. 12 illustrates a Resume process flow. At block 1202, the TQ ID for output, the TQ partitioning type, a node identifier, and the range partitioning keys are obtained. At decision block 1204 (i.e., "node executed by QC?"), if the node is being serially executed, processing continues at block 1206. At block 1206, the process implementing the node (e.g., QC, data flow scheduler) empties the entire row source into the appropriate TQ, and Resume ends at block 1212.

If, at decision block 1204, the node is parallelized, processing continues at block 1208 to send a resume message to all of the slaves executing the current node. The next state for the slaves is marked as "DONE," and the count of the number of slaves that have reached that state is set to zero at processing block 1210. Resume ends at block 1212.

ProcessReadyMsg

Figure 13:
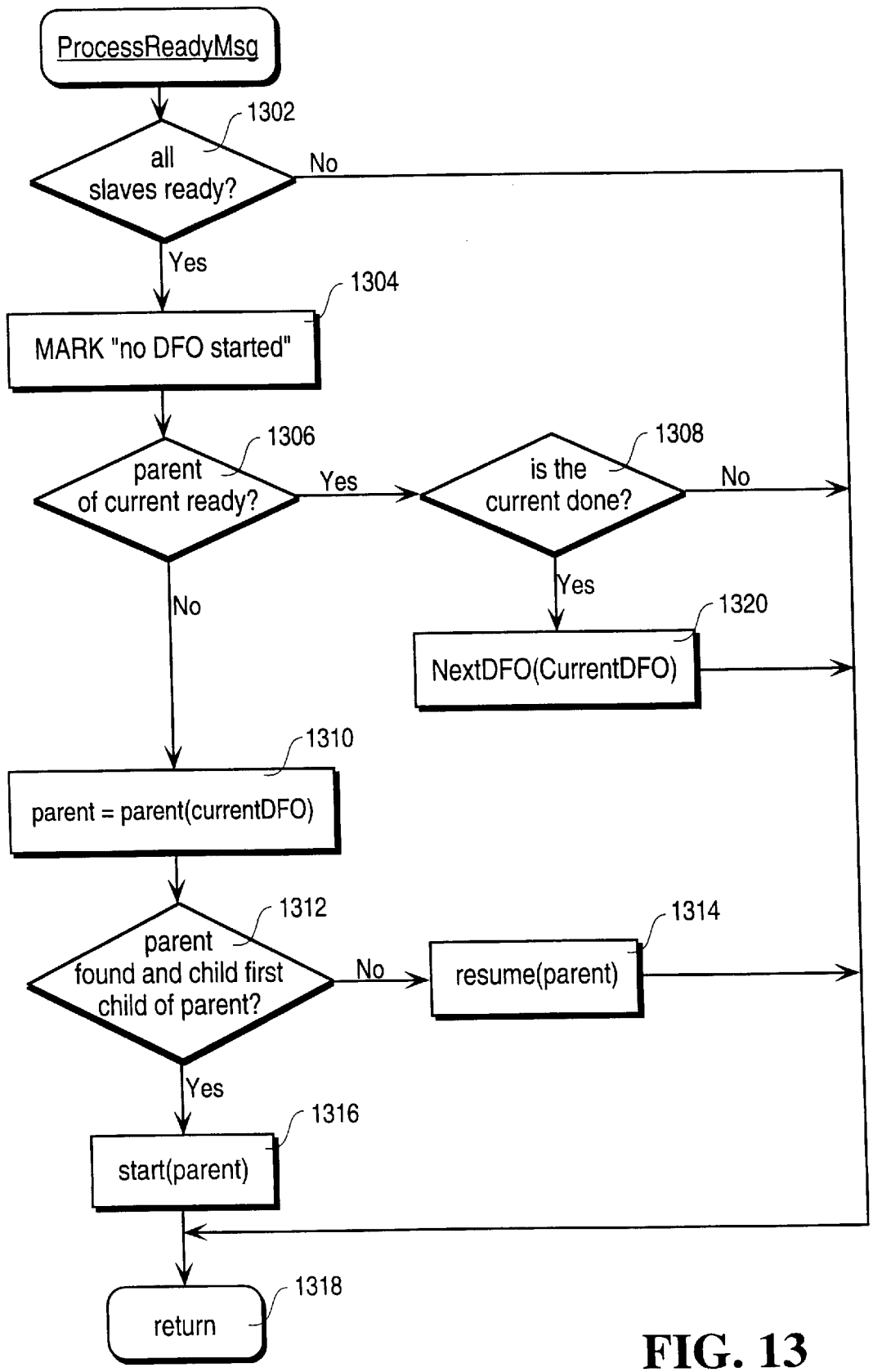
FIG. 13 illustrates a process flow for ProcessReadyMsg.

When a producer slave is about to produce rows, the producer slave sends a "Ready" message to the data flow scheduler. When a ready message is received by the data flow scheduler, the data flow scheduler processes the ready message using ProcessReadyMsg. FIG. 13 illustrates a process flow for ProcessReadyMsg. At decision block 1302 (i.e., "all slaves ready?") if all of the slaves are not ready, processing returns to Fetch at 1318 to wait until all of the slaves reach the ready state.

If, at decision block 1302, it is determined that all of the states have reached ready (i.e., count is equal to the number of slaves), processing continues at processing block 1304. At block 1304, no DFO started is indicated. At decision block 1306 (i.e., "parent of current ready?"), if the parent of the current node is ready to receive the rows produced by the slaves implementing the current node, processing continues at decision block 1308.

At decision block 1308 (i.e., "is the current done?") if the slaves executing the current DFO have not reached the done state, processing returns to Fetch to wait for them to complete. If the slaves have reached the done state, NextDFO is invoked to implement the next node after the current DFO, and processing returns to Fetch at block 1318.

If, at decision block 1306 (i.e., "parent of current ready?"), the parent of the current is not ready, processing continues at 1310 to identify the parent of the current DFO. At decision block 1312 (i.e., "child first child of parent), if the current node has a parent and the current node is the first child of the parent to be executed, Start is invoked at block 1316 to start the parent. If the child is not the first child of the parent, the parent has already been started. Therefore, at block 1314, Resume is invoked to allow the parent to continue processing (e.g., consume the rows produced by the child). In either case, processing returns to Fetch at block 1318.

NextDFO

After the most recently process DFO reaches the done state, it is necessary to determine the next DFO to be executed. The pointers that implement the structure of the row source and DFO trees are used to identify the next DFO to be executed.

Figure 5:
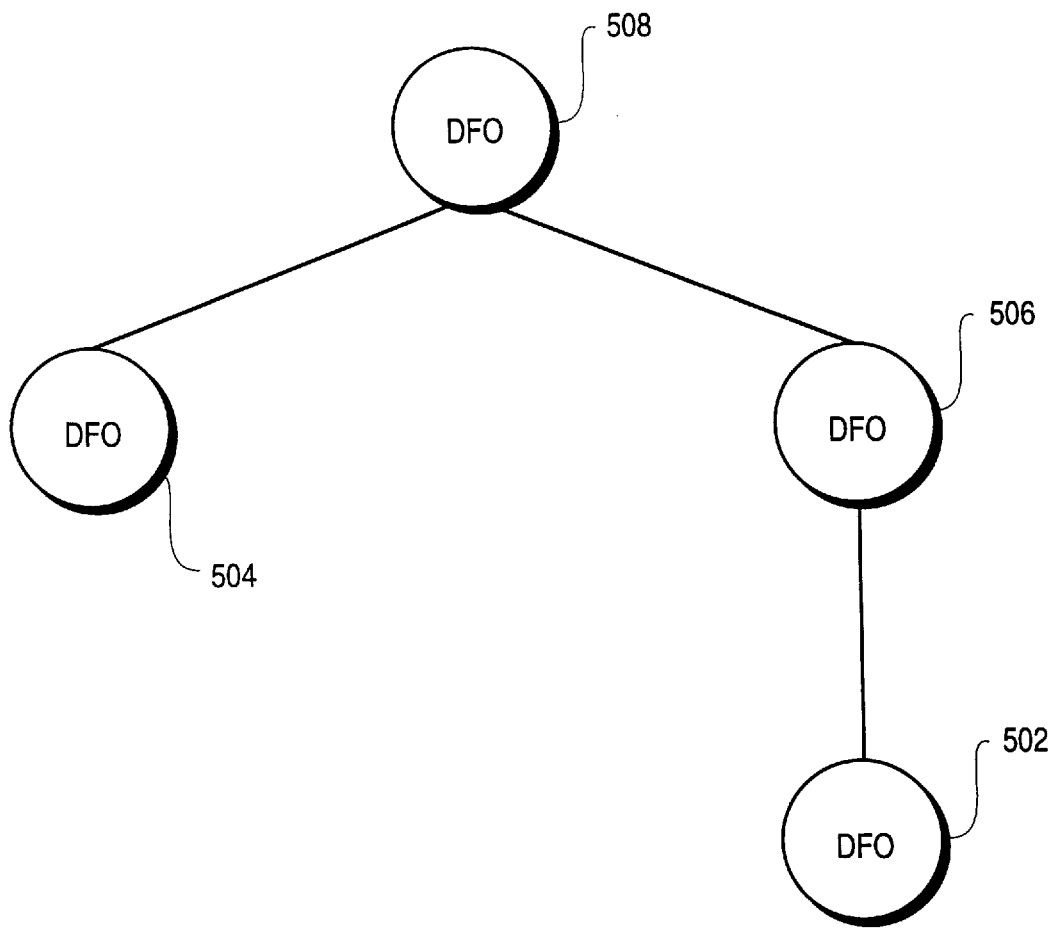
FIG. 5 illustrates a right-deep row source tree.

Generally, the row source tree is left deep. A row source tree is left deep, if any row source subtree is the subtree of only the left input to its enclosing row source subtree. However, it is possible for a row source tree to be right deep. When a done reply is received from all of the slaves, it is necessary to determine when to execute the next DFO. In a right-deep row source tree illustrated in FIG. 5, the next DFO to execute after execution of current DFO 502 is DFO 504 not parent DFO 506 even though current DFO 502 is the rightmost child of parent DFO 506. That is, next DFO 504 is not the parent of the current DFO 502. Thus, the normal next state (i.e., resume parent DFO 506) after receiving the done from current DFO 502. Therefore, it is necessary to wait until current DFO 502 is done, and parent DFO 506 has reached a stable, ready state. Once parent DFO 506 has reached a ready state, the message from the data flow scheduler is not a resume for parent DFO 506. Instead, the data flow scheduler transmits a message to execute next DFO 504, and to start DFO 508. When it is time to resume parent DFO 506, it is important to remember that parent DFO 506 has already been started, and is waiting for a resume message. All of this is handled by NextDFO.

Figure 14A:
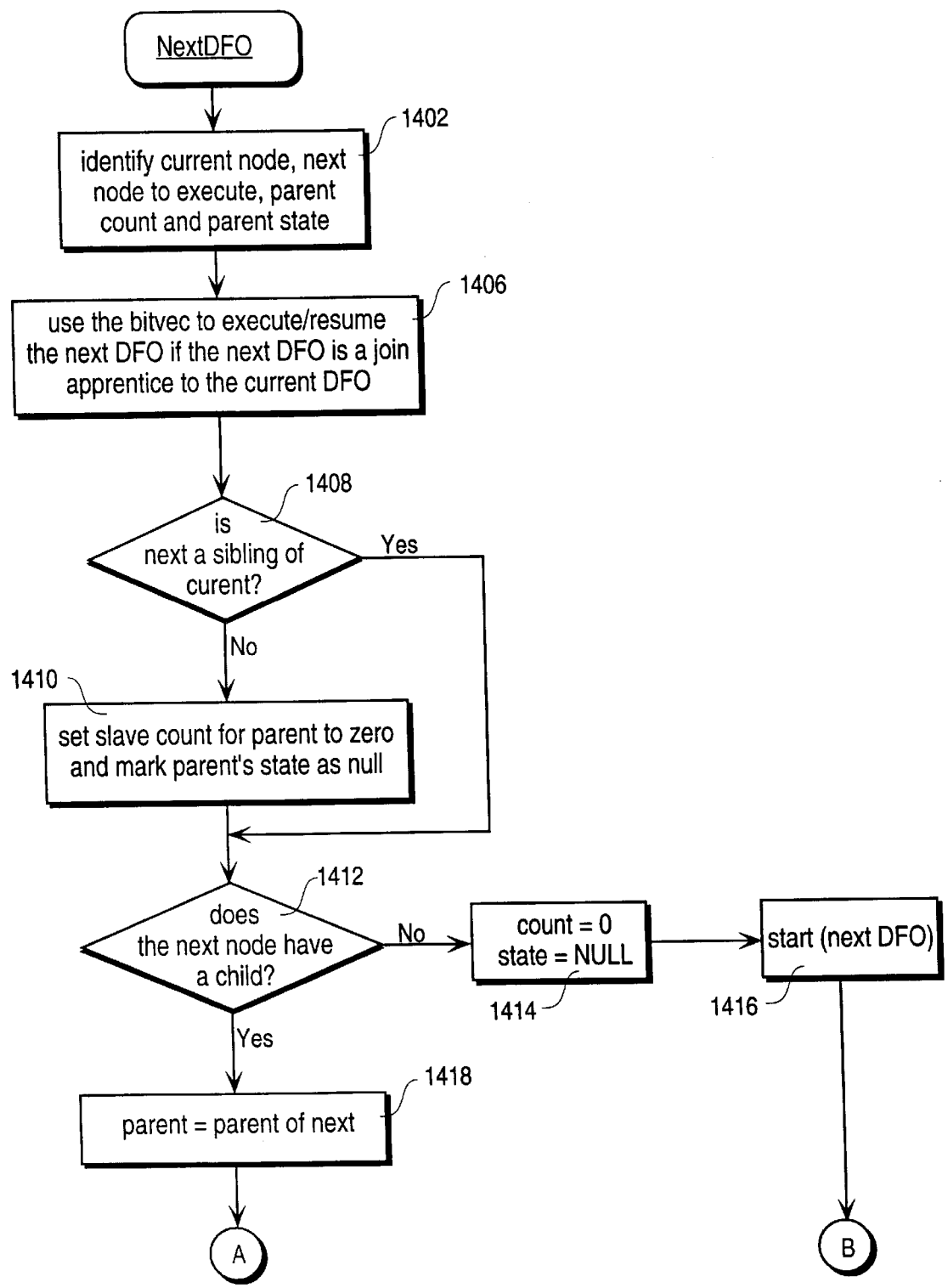
FIG. 14 provides a process flow for NextDFO.
Figure 14B:
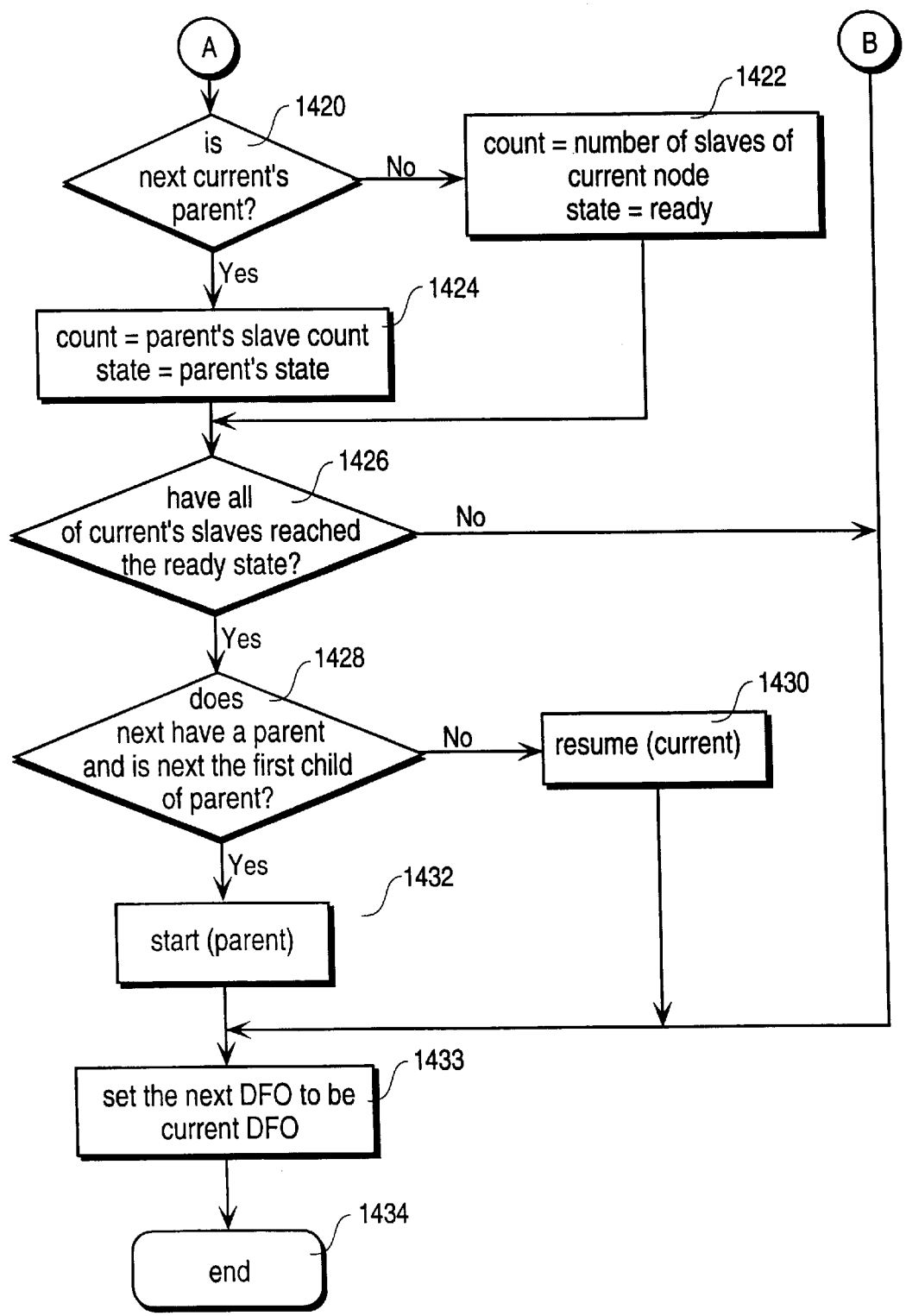

FIGS. 14A and 14B provide a process flow for NextDFO. At processing block 1402, the current node, the next node in the execution chain, the state of the parent, and the number of slaves executing the parent that have reached that state are identified. At processing block 1406, the sorcerer's apprentice bit vector is used to execute or resume, if the next DFO is a join apprentice (i.e., a DFO that needs to examine the join apprentice bit vector) to the current DFO.

At decision block 1408 (i.e., "is next a sibling of current?"), if the next DFO to be implemented is a sibling of the current DFO, processing continues at decision block 1412. If, at decision block 1408, the next DFO is not a sibling of the current DFO, the slave count for the parent is set to zero, and the parent's state is set to NULL at block 1410. Processing continues at decision block 1412.

At decision block 1412 (i.e., "does the next node have a child?"), if the next node does not have a child, the current DFO's state is set to NULL, and the number of slaves that have reached that state is set to zero at processing block 1414. At processing block 1416, Start is invoked to start next DFO. The next DFO is set to the current DFO at processing block 1433, processing returns at 1434.

If, at decision block 1412, the next node does have a child, processing continues at block 1418. At block 1418, parent is set to the parent of the next node. At decision block 1420 (i.e., "is next current's parent?"), if the next node is not the current's parent, the count is set to the number of slaves executing the current node, and the state is set to the ready state. Processing continues at decision block 1426.

If, at decision block 1420, it is determined that next is current's parent, processing continues at block 1424 to set the state of the current node to the state of its parent, and to set the count for the number of slaves that have reached that state to the number of slaves implementing the parent that have reached that state. Processing continues at decision block 1426.

At decision block 1426 (i.e., "have all current's slaves reached the ready state?"), if all of the slaves implementing the current node have not reached ready, the next DFO is set to the current DFO at processing block 1433, and processing returns at block 1434. If all of the slaves are ready, processing continues at decision block 1428. At decision block 1428 (i.e., "does next have a parent and is next the first child of the parent?"), if next is the first child of its parent, Start is invoked at block 1432 to start parent. If next is not the first child of its parent, Resume is invoked at block 1430 to resume the parent. In either case, the next DFO is set to the current DFO at block 1433, and processing returns at block 1434.

Close Operation

The close operation terminates the query slaves. Close can occur when the entire row source tree has been implemented, or at the end of a DFO tree. Initially, the parallelizer sends a stop message to each of the slaves running DFOs in the parallelizer's DFO tree to tell each of the slaves to stop processing. This triggers the slaves to perform any clean up operations (e.g., release any locks on data or resources) and to reach a state for termination. In addition, the close operation remits the slaves to the free pool.

Figure 16:
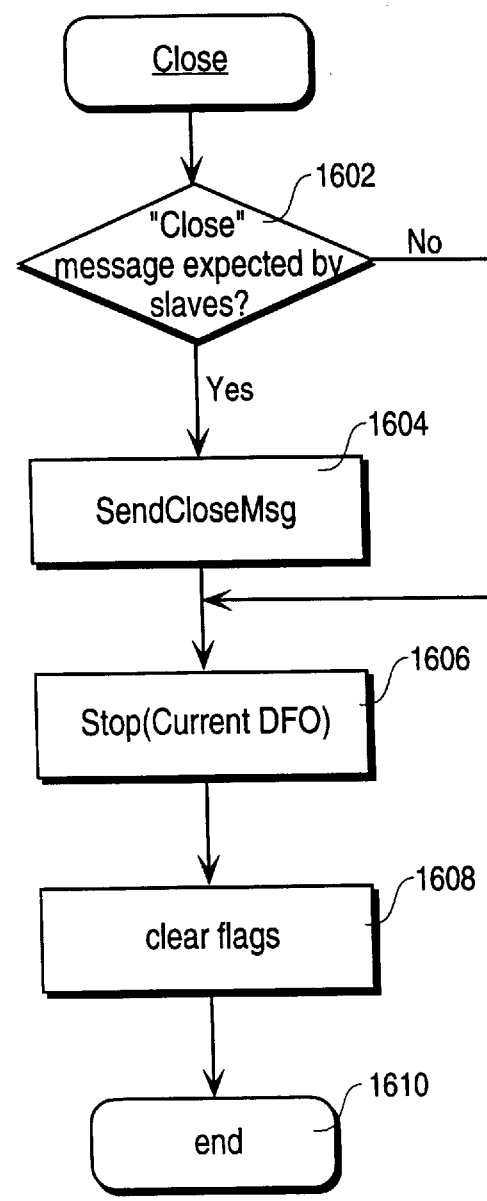
FIG. 16 illustrates a process flow for Close.

FIG. 16 illustrates a process flow for Close. At decision block 1601 (i.e., "'Close' message expected by slaves?"), if a close message is expected by the slaves, SendCloseMsg at block 1604. Stop is invoked at block 1606. Flags are cleared at block 1608, and processing ends at block 1610.

Figure 17:
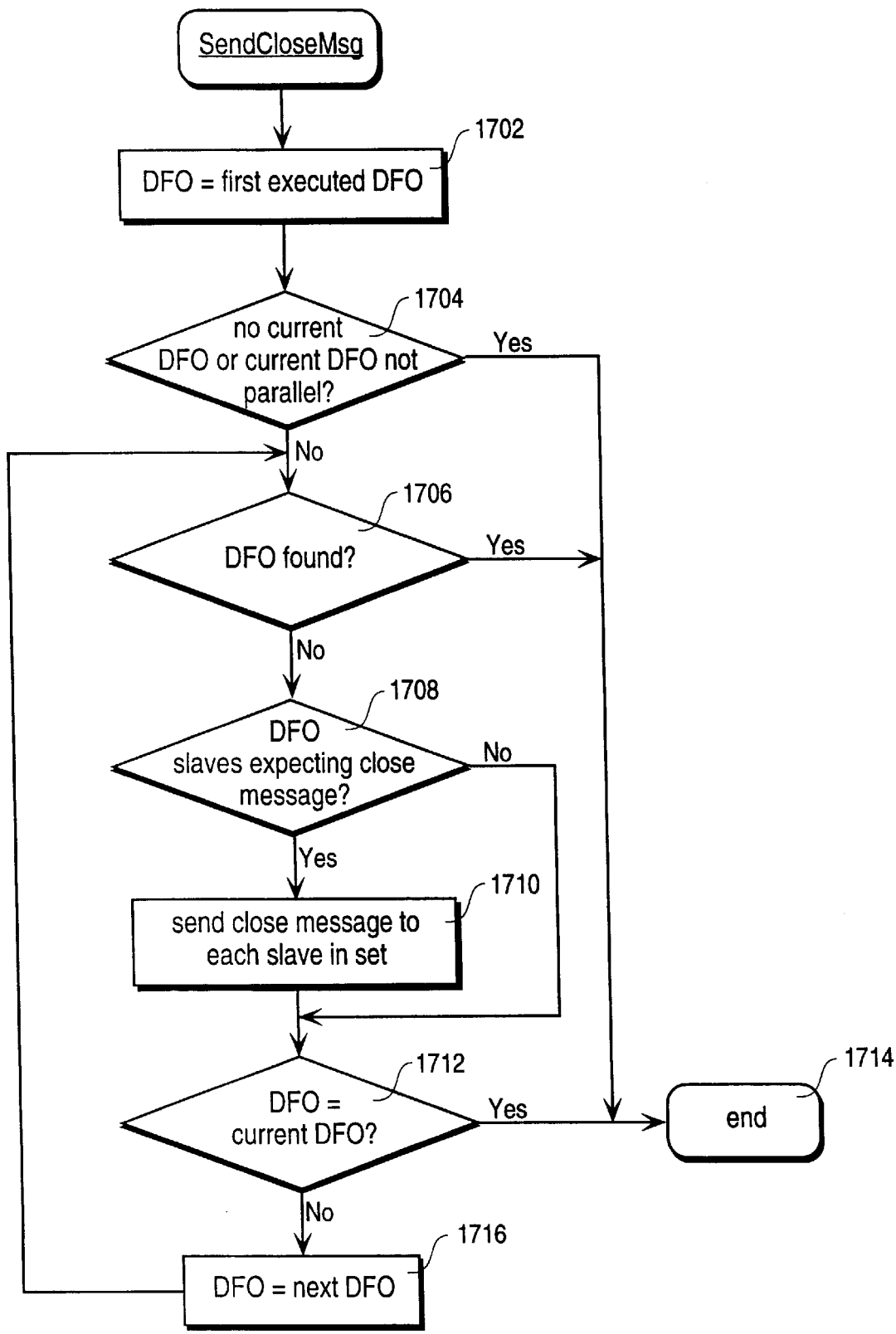
FIG. 17 illustrates a process flow for SendCloseMsg.

FIG. 17 illustrates a process flow for SendCloseMsg. At block 1702, DFO is set to the first executed DFO. At decision block 1704 (i.e., "no current DFO or current DFO not parallel?"), if there is not current DFO or the current DFO is not parallel, processing ends at block 1714. If not, processing continues at decision block 1706.

At decision block 1706 (i.e., "DFO found?"), if a DFO is not found, processing ends at block 1714. If a DFO is found, processing continues at decision block 1708. At decision block 1708 (i.e., "DFO slaves expecting close message?"), if the DFO is expecting a close message, processing continues at block 1710 to send a close message to each of the slaves in the set, and processing continues at decision block 1716. If the DFO is not expecting a close message, processing continues at decision block 1716.

At decision block 1716 (i.e., "DFO=current DFO?"), if the DFO is the current DFO, processing ends at block 1714. If it is not the current DFO, then processing continues at block 1716 to get the next DFO, and processing continues at decision block 1706 to process any remaining DFOs.

Figure 19:
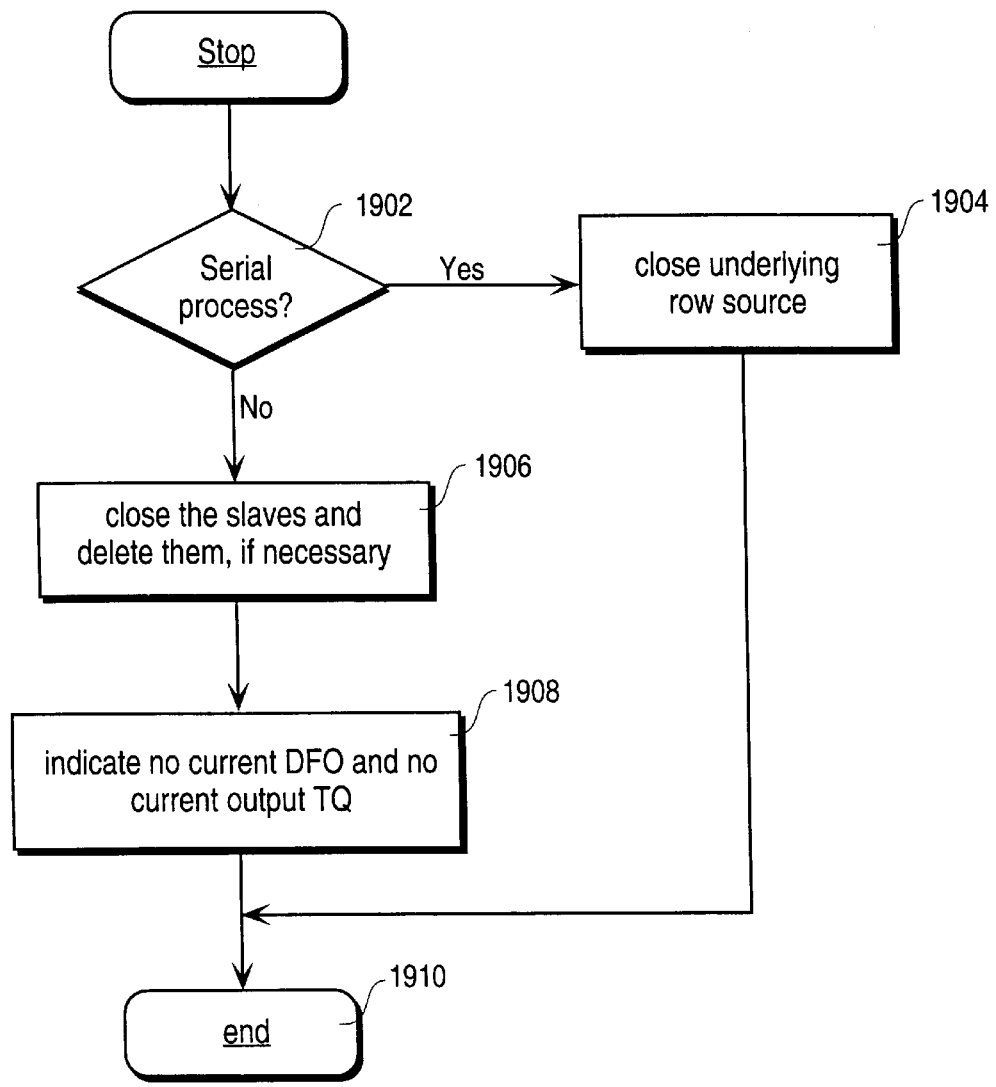
FIG. 19 illustrates a Stop process flow.

FIG. 19 illustrates a Stop process flow. At decision block 1902 (i.e., "Serial process?"), if the process is a serial process, processing continues at block 1904 to close the underlying row source, and processing ends at block 1610. If the process is not a serial process, processing continues at block 1906. At block 1906, the slaves are closed, and deleted, if necessary. At block 1908, current DFO and current output TQ are cleared. Processing ends at block 1610.

Row Operator

The present invention provides the ability to pass a routine from a calling row source to an underlying row source. The routine can be used by the underlying row source to perform a function for the calling row source. For example, a calling row source can call an underlying row source and pass a routine to the underlying row source to place the row sources in a location for the calling row source. Once the underlying routine has produced the rows, the underlying row source can use the callback routine to place the row sources in a data store location (e.g., database or table queue).

SLAVE PROCESSES

Figure 7A:
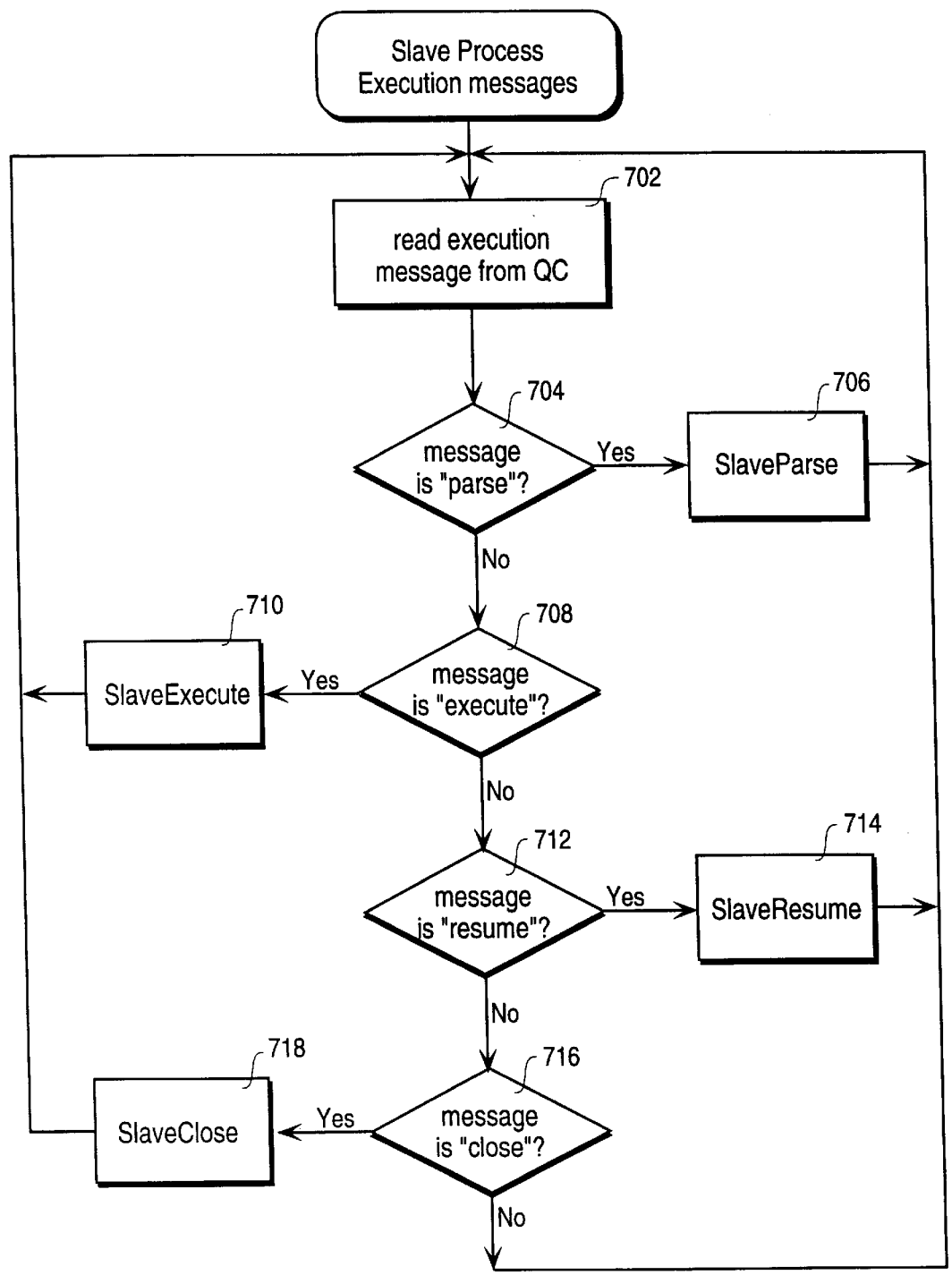
FIGS. 7A–7F illustrates slave DFOs process flows.

A slave DFO receives execution messages from the dataflow scheduler. For example, a slave DFO may receive a message to parse DFO SQL statements, resume operation, execute a DFO, or close. When a message is received by a slave DFO, the slave DFO must determine the meaning of the message and process the message. FIG. 7A illustrates a process flow for receipt of execution messages.

At block 702, an execution message from the QC is read. At decision block 704 (i.e., "message is 'parse'?"), if the execution message is a parse message, processing continues at block 706 to invoke SlaveParse, and processing continues at block 702 to process execution messages sent by the QC. If the execution message is not a parse message, processing continues at decision block 708. At decision block 708 (i.e., "message is 'execute'?"), if the execution message is an execute message, processing continues at block 710 to invoke SlaveExecute, and processing continues at block 702 to process execution messages.

If, at decision block 708, the execution message is not an execution message, process continues at decision block 712. At decision block 712 (i.e., "message is 'resume'?"), if the execution message is a resume message, processing continues at block 714 to invoke SlaveResume, and processing continues at block 702 to process execution messages. If the message is not a resume message, processing continues at decision block 716. At decision block 716 (i.e., "message is 'close'?"), if the execution message is a close message, processing continues at block 718 to invoke SlaveClose. If the message is not a close message, processing continues at decision block 702 to process execution messages.

SlaveParse

Figure 7B:
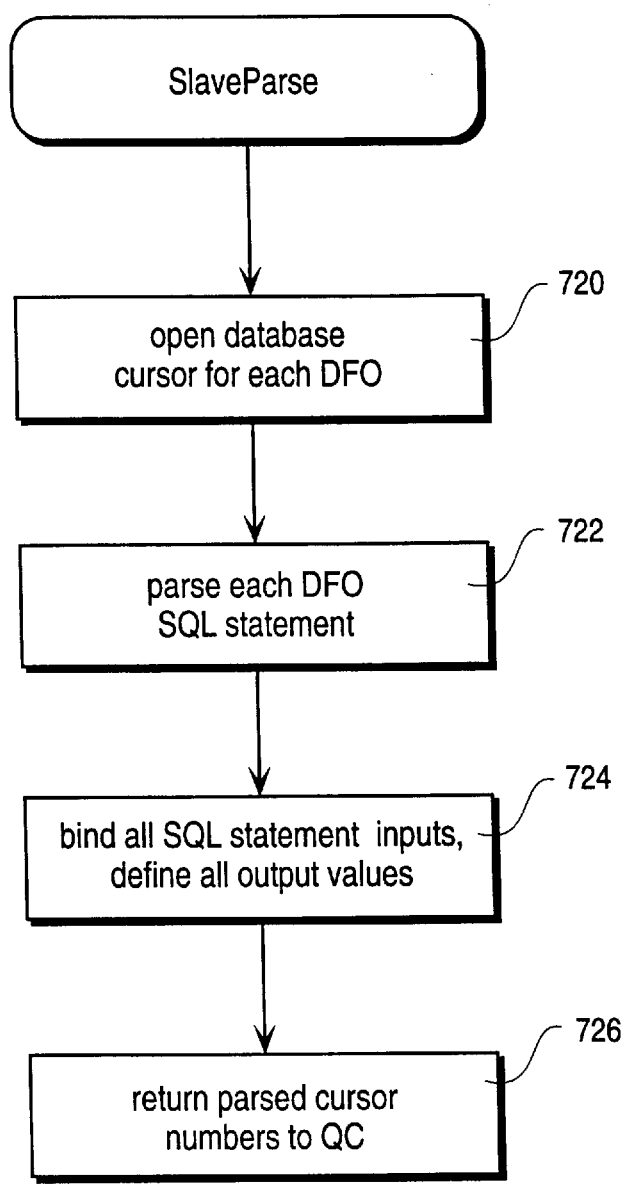

A parse execution message is sent after it is determined that the DFO SQL statements must be parsed before execution. FIG. 7B illustrates a process flow for a slave DFO processing a parse message. At block 720, a database cursor is opened for each DFO. At block 722, each DFO SQL statement is parsed. Processing block 724 binds all SQL statement inputs and defines all output values. At processing block 726, the parsed cursor numbers are returned to the QC, and the SlaveParse process ends.

SlaveExecute

Figure 7C:
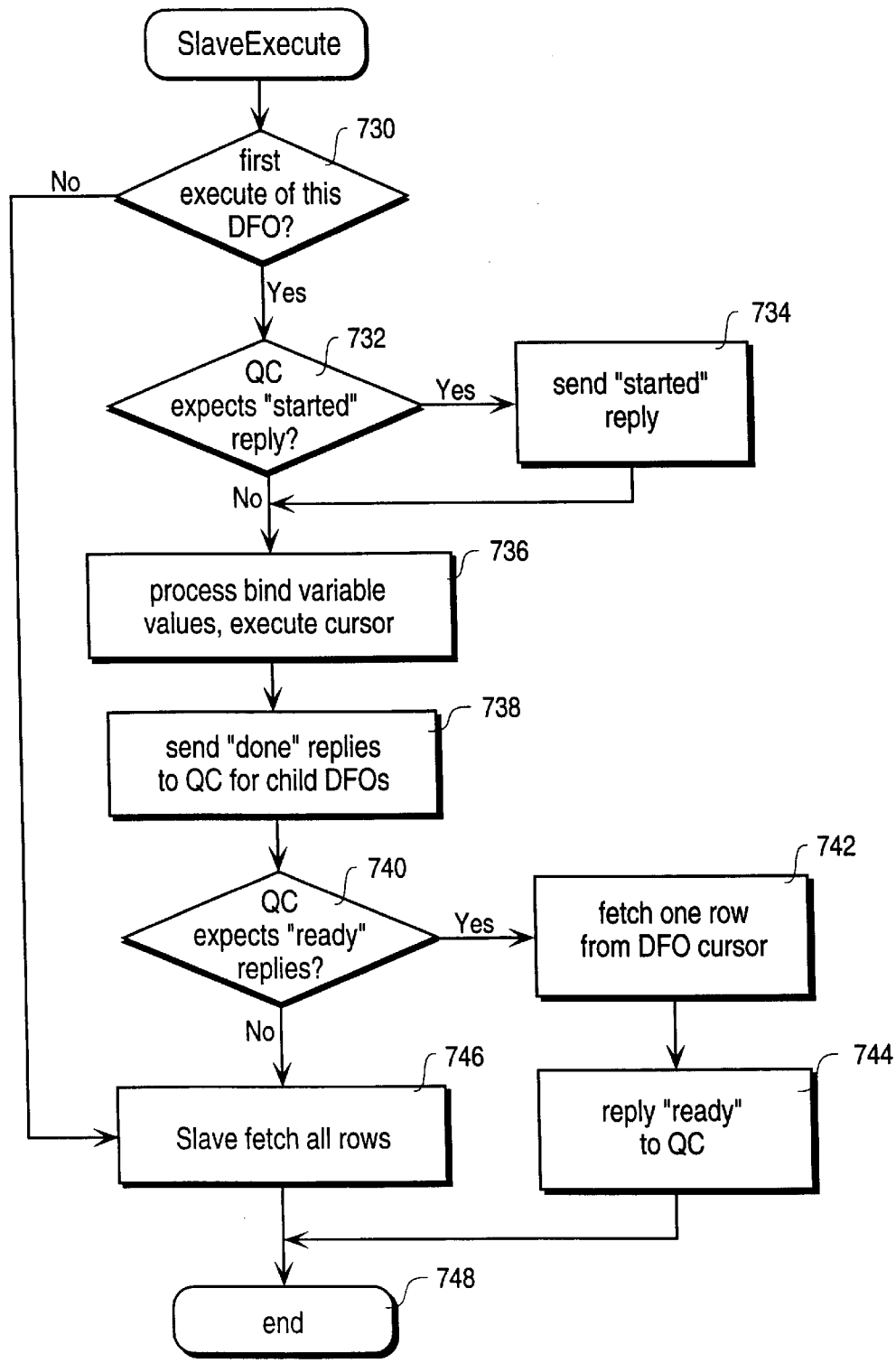
Figure 7D:
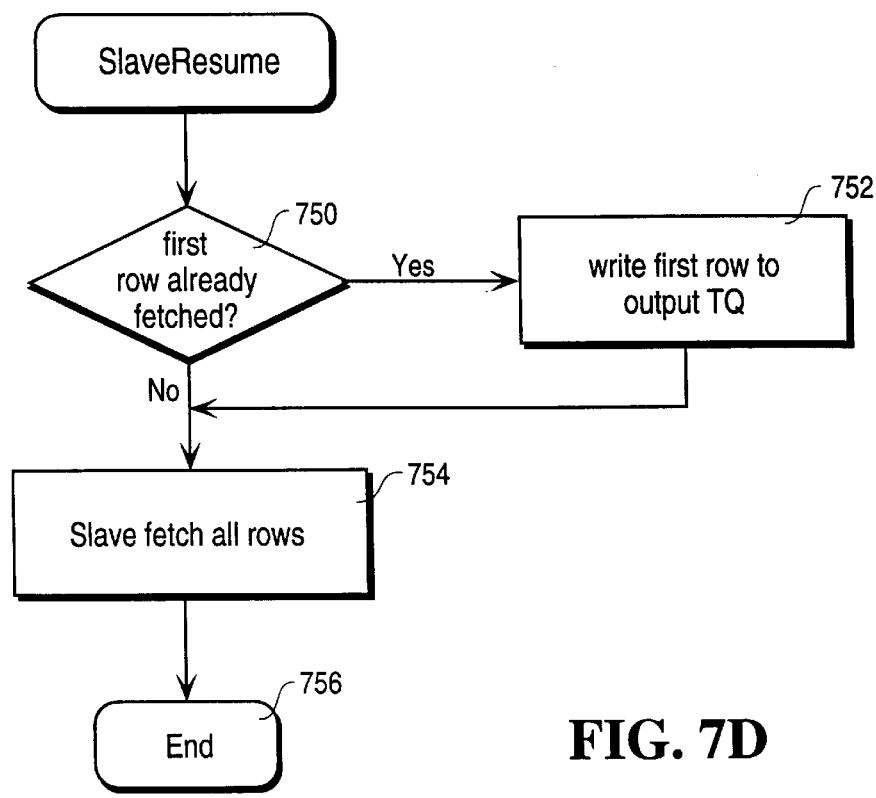

If an execute message is received from the QC, the slave DFO receiving the message must execute the DFO. FIG. 7C illustrates a process flow for executing a DFO. At decision block 730 (i.e., first execute of this DFO?"), if this is not the first execution message received for this DFO, processing continues at block 746 to invoke SlaveFetch to fetch all rows, and processing ends at block 748.

If this is the first execution message received, processing continues at decision block 732 (i.e., QC expects 'started'?") to determine whether the QC expects a reply indicating that the slave has started. If yes, processing continues at block 734 to send a "started" message to the QC, and processing continues at block 736. If not, processing continues at block 736.

Block 736 processes bind variables, and executes the cursor. At block 738, a "done" replies are sent to QC for all of the child DFOs of the DFO being executed. At decision block 740 (i.e., "QC expects 'ready' replies?"), if the QC expects a ready message to indicate that the slave DFO is ready to fetch rows, processing continues at block 742. At block 742, one row is fetched from the DFO cursor. Processing continues at block 744 to send a "ready" reply to the QC, and processing ends. If the QC does not expect a ready message, processing continues at block 746 to fetch all rows from the DFO cursor, and processing ends at block 748.

SlaveResume

Figure 7E:
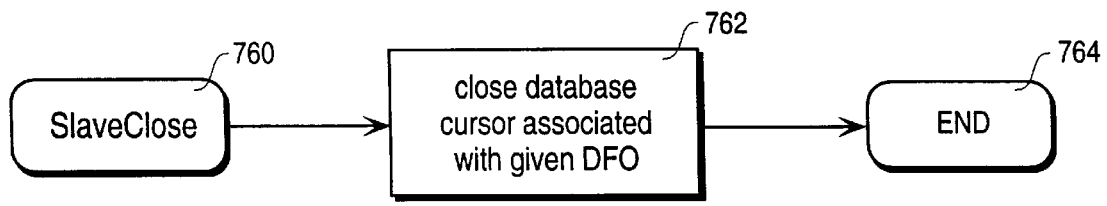

After a slave DFO sends a ready message, it waits for a resume message from the QC to continue processing. When it receives a resume message, a slave DFO resumes its execution. FIG. 7E illustrates a SlaveResume process flow. At decision block 750 (i.e., "first row already fetched?"), if the first row has already been fetched, processing continues at block 752 to write the first row to the slave DFO's output TQ, and processing continues at block 754. If the first row has not been fetch, processing continues at block 754. At block 754, SlaveFetch is invoked to fetch any remaining rows from the DFO cursor. Processing ends at block 756.

SlaveClose

Upon completion of a DPO, the database cursor associated with the completed DFO can be closed. FIG. 7E illustrates a process flow for SlaveClose. At block 762, the DFO's database cursor is closed. Processing ends at block 764.

SlaveFetch

Figure 7F:
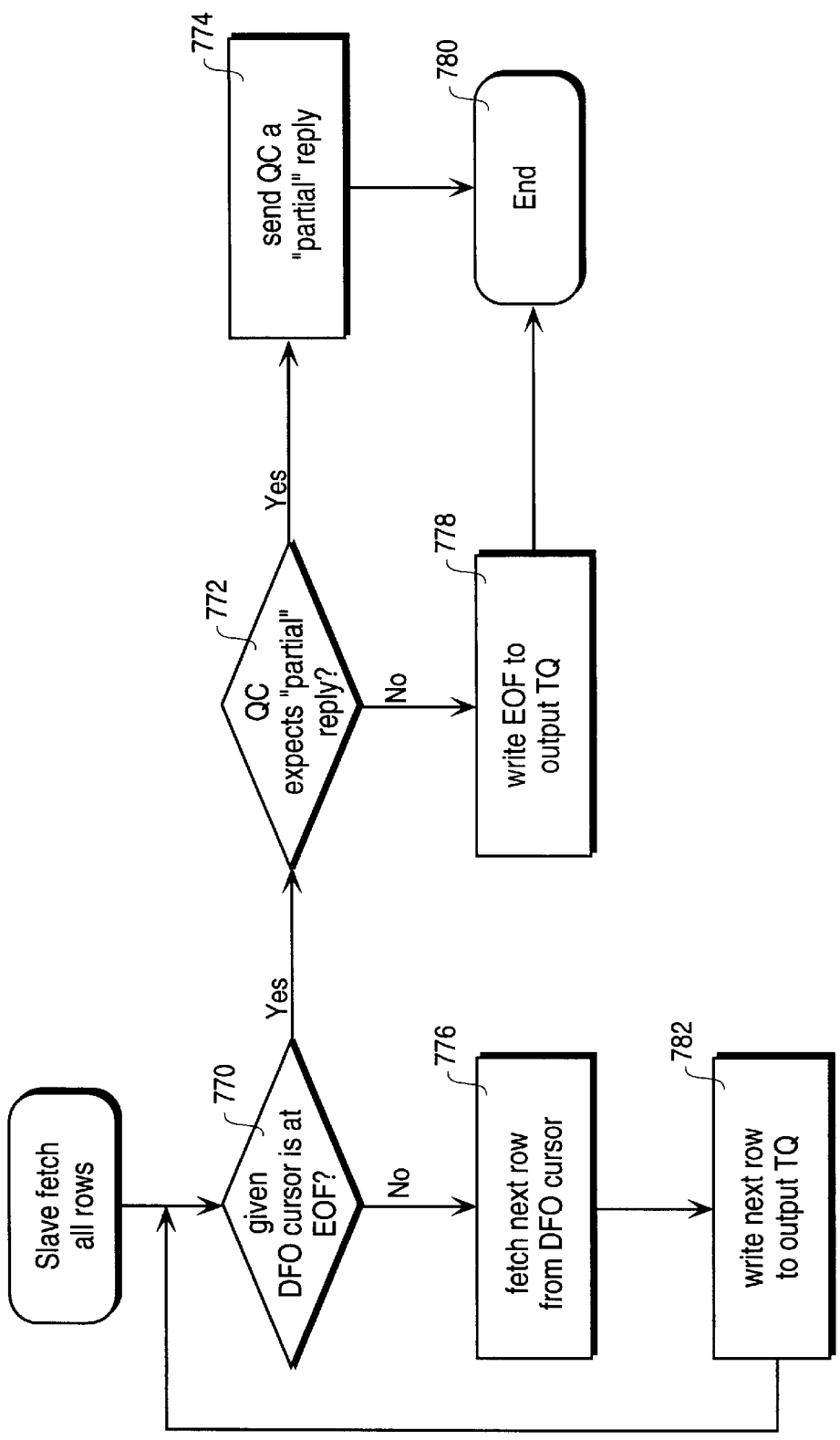

If a "ready" reply is not expected, or a slave DFO receives a resume after sending a "ready" reply, a slave DFO can fetch all the rows from a DFO cursor. FIG. 7F illustrates a process flow to fetch all rows. At decision block 770 (i.e., "given DFO cursor is at EOF?"), if the DFO cursor is at eof, processing continues at decision block 772.

At decision block 772 (i.e., "QC expects 'partial' reply?"), if a partial execution message is expected by the QC to indicate that the slave DFO has completed processing the range of rowids provided by the QC, processing continues at block 774 to send the partial message to the QC, and processing ends at 780. If a partial message is not expected (as determined at decision block 772), processing continues at block 778 to write an eof to the output TQ for the slave DFO. Processing ends at block 780.

If, at decision block 770 (i.e., given DFO cursor is at EOF?"), it is determined that the DFO cursor is not at eof, processing continues at block 776 to fetch the next row from the DFO cursor. At block 782, the row is written to the slave DFO's output TQ, and processing continues at decision block 770 to fetch any remaining rows from the DFO cursor.

OTHER PARALLELIZATION EXAMPLES

One application for parallelism is the creation of an index. The index creation operation includes table scan, subindex create, and merge subindices operations. The table scan and subindex create can be performed in parallel. The output from the subindex creation operation is the input to the merge subindices process. In addition, a table can be created in parallel. A subtable create operation can create a table in parallel, and the subtables can be merged.

Thus, a method and apparatus for processing queries in parallel has been provided.

We claim:

1. A computer-implemented method of implementing database management system (DBMS) operations in parallel, independent of physical storage locations, said computer-implemented method comprising the steps of:

generating a serial execution plan for operations in said DBMS;

generating a parallelized execution plan for said serial execution plan, said parallelized execution plan including first and second operations, said second operation including one or more slave processes operating on a plurality of data partitions, the quantity of said data partitions being greater than the quantity of said slave processes, each of said slave processes operating on a different one of said data partitions, at least one of said slave processes operating on more than one of said data partitions;

executing said parallelized execution plan when a plurality of parallel resources of said computer system are available, said first and second operations executing in parallel; and executing said serial execution plan when said plurality of resources are not available.

2. The method of claim 1 wherein said step of generating a parallelized execution plan includes the steps of:

identifying one or more segments of said serial execution plan that can be parallelized; and identifying partitioning requirements of said one or more segments.

3. The method of claim 1 wherein said step of generating a parallelized execution plan is based on a specification of parallelism in a statement specifying one of said operations.

4. A method of generating an execution plan to process a database management system (DBMS) operation in parallel including the steps of:

generating an execution plan for said operation;

examining said execution plan from bottom up;

identifying a parallelized portion of said execution plan, said parallelized portion can be processed in parallel, said parallelized portion including first and second operations, said first and second operations being executable in parallel, said second operation including one or more slave processes operating on a plurality of data partitions, the quantity of said data partitions being greater than the quantity of said slave processes, each of said slave processes operating on a different one of said data partitions, at least one of said slave processes operating on more than one of said data partitions;

identifying some serial portion of said execution plan, said serial portion can be processed in serial;

allocating a central scheduler between said parallelized portion and said serial portion.

5. The method of claim 4 further including the steps of:

identifying a first data flow requirement for a first portion of said execution plan said first data flow requirement corresponding to a partitioning of a data flow required by said first portion;

identifying a second data flow requirement for a second portion of said execution plan said second data flow requirement corresponding by said second portion; and allocating a data flow director between said first portion and said second portion when said first data flow requirement is not compatible with said second data flow requirement said data flow director repartitioning a data flow of said first portion to be compatible with said second data flow requirement.

6. A computer-implemented method of executing database management system (DBMS) operations in parallel in a computer system, said method comprising the steps of:

generating an execution plan to execute said operations in parallel, said execution plan including first and second operations;

initiating an operation coordinator in said computer system to coordinate execution of said execution plan;

initiating, by said operation coordinator, a first set of slaves operating on a plurality of data partitions to produce data, the quantity of said data partitions being greater than the quantity of said first set of slave processes, each of said slave processes of said first set of slave processes operating on a different one of said data partitions, at least one of said slave processes operating on more than one of said data partitions;

initiating, by said operation coordinator, a second set of slaves to consume data; and directing said second set of slaves to produce data and said first set of slaves to consume data when said first set of slaves finishes producing data.

7. The method of claim 6 wherein said execution plan is comprised of operator nodes and said operator nodes are linked together to form execution sets.

8. A computer-implemented method of executing database management system (DBMS) operations in parallel in a computer system, said method comprising the steps of:

generating an execution plan to execute said operations in parallel, said execution plan including first and second operations;

initiating a data flow scheduler in said computer system to coordinate data flow;

initiating, by said data flow scheduler, producer slaves operating on a plurality of data partitions to produce a first data production the quantity of said data partitions being greater than the quantity of said producer slaves, each of said producer slaves operating on a different one of said data partitions, at least one of said producer slaves operating on more than one of said data partitions;

initiating, by said data flow scheduler, consumer slaves to consume said first data production;

transmitting a ready message to said data flow scheduler when said producer slaves become ready to produce data;

transmitting a completion message to said data flow scheduler when said first data production is completed:

generating, by said data flow scheduler, in response to said completion message, an identification of a plurality of said consumer slaves that did not receive data in said first data production, said generating step using information derived from said ready message;

examining, by said producer slaves, said identification during a subsequent data production; and reducing said subsequent data production such that said subsequent data production does not produce data for said plurality of said consumer slaves.

9. In a computer system, a database management apparatus for implementing database operations in parallel, independent of physical storage locations, said database management apparatus comprising;

means for generating a serial execution plan for operations in said database management apparatus;

means for generating a parallelized execution plan for said serial execution plan, said parallelized execution plan including first and second operations, said second operation including one or more slave processes operating on a plurality of data partitions, the quantity of said data partitions being greater than the quantity of said slave processes, each of said slave processes operating on a different one of said data partitions, at least one of said slave processes operating on more than one of said data partitions;

means for executing said parallelized execution plan when a plurality of parallel resources of said computer system are available, said first and second operations executing in parallel; and means for executing said serial execution plan when said plurality of resources are not available.

10. The apparatus of claim 9 wherein said means for generating a parallelized execution plan further includes:

means for identifying one or more segments of said serial execution plan that can be parallelized; and means for identifying partitioning requirements of said one or more segments.

11. The apparatus of claim 9 wherein said means for generating a parallelized execution plan is based on a specification of parallelism in a statement specifying one of said operations.

12. In a computer system, a database management apparatus for generating an execution plan to process database operations in parallel, said database management apparatus comprising;

means for generating an execution plan for said operations;

means for examining said execution plan from bottom up;

means for identifying a parallelized portion of said execution plan, said parallelized portion including first and second operations, said parallelized portion being processed in parallel, said second operation including one or more slave processes operating on a plurality of data partitions, the quantity of said data partitions being greater than the quantity of said slave processes, each of said slave processes operating on a different one of said data partitions, at least one of said slave processes operating on more than one of said data partitions;

means for identifying some serial portion of said execution plan, said serial portion being processed in serial; and means for allocating a central scheduler between said parallelized portion and said serial portion.

13. The apparatus of claim 12 further including:

means for identifying a first data flow requirement for a first portion of said execution plan said first data flow requirement corresponding to a partitioning of a data flow required by said first portion;

means for identifying a second data flow requirement for a second portion of said execution plan said second data flow requirement corresponding to said second portion; and means for allocating a data flow director between said first portion and said second portion when said first data flow requirement is not compatible with said second data flow requirement, said data flow director repartitioning a data flow of said first portion to be compatible with said second data flow requirement.

14. In a computer system, a database management apparatus for executing database operations in parallel, said database management apparatus comprising:

means for generating an execution plan to execute said operations in parallel, said execution plan including first and second operations, said first and second operations being executed in parallel;

means for initiating an operation coordinator in said computer system to coordinate execution of said execution plan;

means for initiating, by said operation coordinator, a first set of slaves operating on a plurality of data partitions to produce data, the quantity of said data partitions being greater than the quantity of said first set of slave processes, each of said slave processes of said first set of slave processes operating on a different one of said data partitions, at least one of said slave processes operating on more than one of said data partitions;

means for initiating, by said operation coordinator, a second set of slaves to consume data; and means for directing said second set of slaves to produce data and said first set of slaves to consume data when said first set of slaves finishes producing data.

15. The apparatus of claim 14 wherein said execution plan is further comprised of operator nodes and said operator nodes are linked together to form execution sets.

16. In a computer system, a database management apparatus for executing database operations in parallel, said database management apparatus comprising:

means for generating an execution plan to execute said operations in parallel, said execution plan including first and second operations, said first and second operations being executed in parallel;

means for initiating a data flow scheduler in said computer system to coordinate data flow;

means for initiating, by said data flow scheduler, producer slaves operating on a plurality of data partitions to produce a first data production, the quantity of said data partitions being greater than the quantity of said producer slaves, each of said producer slaves operating on a different one of said data partitions, at least one of said producer slaves operating on more than one of said data partitions;

means for initiating, by said data flow scheduler, consumer slaves to consume said first data production;

means for transmitting a ready message to said data flow scheduler when said producer slaves become ready to produce data;

means for transmitting a completion message to said data flow scheduler when said first data production is completed;

means for generating, by said data flow scheduler, in response to said completion message, an identification of a plurality of said consumer slaves that did not receive data in said first data production, said generating step using information derived from said ready message;

means for examining, by said producer slaves, said identification during a subsequent data production; and means for reducing said subsequent data production such that said subsequent data production does not produce data for said plurality of said consumer slaves.

17. An article of manufacture comprising a computer usable mass storage medium having computer readable program code embodied therein for causing a processing means to execute computer-implemented database management operations in parallel, independent of physical storage locations, said computer readable program code in said article of manufacture comprising:

computer readable program code for causing said processing means to generate a serial execution plan for said database management operations;

computer readable program code for causing said processing means to generate a parallelized execution plan for said serial execution plan, said parallelized execution plan including first and second operations, said second operation including one or more slave processes operating on a plurality of data partitions, the quantity of said data partitions being greater than the quantity of said slave processes, each of said slave processes operating on a different one of said data partitions, at least one of said slave processes operating on more than one of said data partitions;

computer readable program code for causing said processing means to execute said parallelized execution plan when a plurality of parallel resources of said computer system are available, said first and second operations executing in parallel; and computer readable program code for causing said processing means to execute said serial execution plan when said plurality of resources are not available.

18. The article of manufacture of claim 17 wherein said computer readable program code for causing said processing means to generate a parallelized execution plan further includes:

computer readable program code for causing said processing means to identify one or more segments of said serial execution plan that can be parallelized; and computer readable program code for causing said processing means to identify partitioning requirements of said one or more segments.

19. The article of manufacture of claim 17 wherein said computer readable program code for causing said processing means to generate a parallelized execution plan is based on a specification of parallelism in a statement specifying one of said operations.

* * * * *